(12) United States Patent
Taki et al.

(10) Patent No.: US 11,529,990 B2
(45) Date of Patent: Dec. 20, 2022

(54) SIGNAL CONTROL APPARATUS AND ELECTRIC POWER STEERING APPARATUS USING SAME

(71) Applicant: DENSO CORPORATION, Kariya (JP)

(72) Inventors: Masaya Taki, Kariya (JP); Toshihiro Fujita, Kariya (JP); Shuji Kuramitsu, Kariya (JP); Koichi Nakamura, Kariya (JP); Toshimitsu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 418 days.

(21) Appl. No.: 16/298,224

(22) Filed: Mar. 11, 2019

(65) Prior Publication Data
US 2019/0291775 A1 Sep. 26, 2019

(30) Foreign Application Priority Data

Mar. 20, 2018 (JP) .............................. JP2018-052359
May 30, 2018 (JP) .............................. JP2018-103871

(51) Int. Cl.
B62D 5/04 (2006.01)
(52) U.S. Cl.
CPC .......... *B62D 5/046* (2013.01); *B62D 5/0481* (2013.01); *B62D 5/0484* (2013.01); *B62D 5/0493* (2013.01)
(58) Field of Classification Search
CPC .... B62D 5/046; B62D 5/0481; B62D 5/0484; B62D 5/0493
See application file for complete search history.

(56) References Cited

U.S. PATENT DOCUMENTS

| | | | |
|---|---|---|---|
| 6,757,601 B1* | 6/2004 | Yao ....................... | B62D 6/002 701/41 |
| 2012/0211299 A1* | 8/2012 | Yanai ................... | B62D 5/0484 180/446 |
| 2014/0367189 A1* | 12/2014 | Minoshima .......... | B62D 15/021 180/422 |
| 2016/0167701 A1 | 6/2016 | Sone | |
| 2016/0288823 A1* | 10/2016 | Mikamo ............ | G01D 5/24461 |

(Continued)

FOREIGN PATENT DOCUMENTS

JP   2017-191092 A   10/2017
JP   2018-038176 A    3/2018
(Continued)

*Primary Examiner* — Maceeh Anwari
*Assistant Examiner* — Charles Pall
(74) *Attorney, Agent, or Firm* — Maschoff Brennan

(57) ABSTRACT

An ECU, which is a signal control apparatus, has a plurality of control units, which control one same motor. Steering angle calculation units acquire sensor signals from the angle sensors provided corresponding to the steering angle calculation units, respectively, and calculate the steering angles in correspondence to the sensor signals. The angle FB units perform the angle FB control based on the angle differences, which are between the target angle and the steering angle and between the target angle and the steering angle, respectively. In the angular FB unit of at least one of the control units, the angular feedback control is performed using the angle difference, which is subjected to the correction processing to reduce the error between the detection angle of the own system and the detection angle of the other system calculated by the steering angle calculation unit of the other control unit.

18 Claims, 15 Drawing Sheets

(56) References Cited

U.S. PATENT DOCUMENTS

2017/0166248 A1* 6/2017 Asao .................... H02P 29/028
2017/0291640 A1  10/2017 Fujita et al.
2018/0015946 A1*  1/2018 Kodera ................ B62D 5/0478

FOREIGN PATENT DOCUMENTS

| JP | 2018038176 | A  | * | 3/2018 |
| JP | 2018038176 | A  | * | 3/2018 |
| KR | 100833565  | B1 | * | 5/2008 |
| KR | 100833565  | B1 | * | 5/2008 |
| WO | 2018/147403| A1 |   | 8/2018 |

* cited by examiner

FIG. 23

| CONTROL PATTERN | INTER-COMPUTER COMMUNICATION INOPERATIVENESS FROM ACTIVATION TIME | INTER-COMPUTER COMMUNICATION INOPERATIVENESS DURING CONTROL OPERATION | EXTERNAL BUS FAILURE |
|---|---|---|---|
| 1 | × | × | ○ |
| 2 | × | ○ | ○ |
| 3 | ○ | ○ | ○ |
| 4 | × | ○ | ○ |
| 5 | ○ | ○ | × |
| 6 | ○ | ○ | × |
| A | × | × | ○ |

SIGNAL CONTROL APPARATUS AND ELECTRIC POWER STEERING APPARATUS USING SAME

CROSS REFERENCE TO RELATED APPLICATION

The present application is based on Japanese patent applications No. 2018-52359 filed on Mar. 20, 2018 and No. 2018-103871 filed on May 30, 2018, the whole contents of which are incorporated herein by reference.

FIELD

The present disclosure relates to a signal control apparatus and an electric power steering apparatus using such a signal control apparatus.

BACKGROUND

A conventional electric power steering apparatus controls a steering operation of a vehicle by using a detection value of a rotation angle sensor. For example, two sensor units are provided for two microcomputers, respectively, so that rotation angle detection values are input to two microcomputers from corresponding sensor units.

SUMMARY

The present disclosure provides a signal control apparatus, which has a plurality of control units for controlling a rotary electric machine. Each of the control units acquires a sensor signal from a sensor unit provided individually, calculates a detection angle of an own system in correspondence to the sensor signal, performs angle feedback control based on an angle difference between a target angle and the detection angle. At least one of the control units performs the angle feedback control by using the angle difference, which is subjected to correction processing for reducing an error between the detection angle of the own system and a detection angle of the other system calculated by the other control unit.

BRIEF DESCRIPTION OF THE DRAWINGS

FIG. 23 is an explanatory diagram for explaining a control pattern in an eighth embodiment.

DETAILED DESCRIPTION OF THE EMBODIMENT

Figure 1:
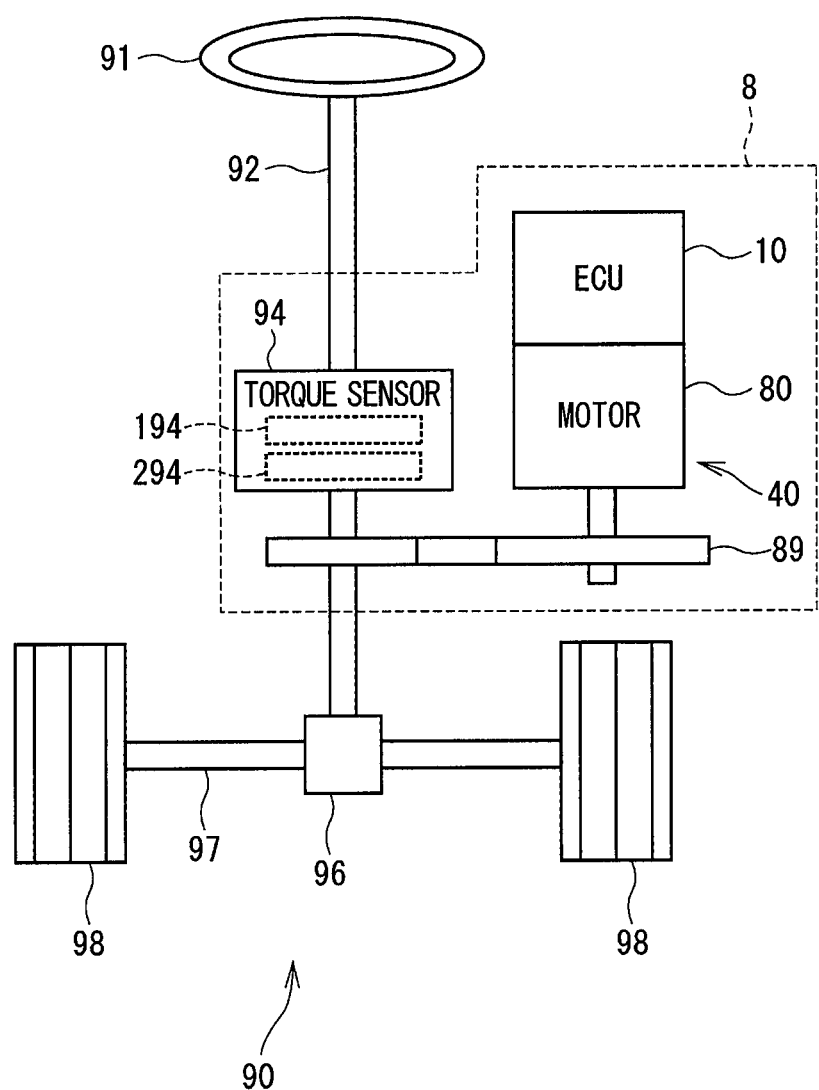
FIG. 1 is a schematic diagram showing a steering system including a steering control apparatus according to a first embodiment.

A signal control apparatus and an electric power steering apparatus using such a signal control apparatus will be described below with reference to the drawings. In the following plural embodiments, substantially same structural configurations are designated with the same reference numerals thereby to simplify the description.

First Embodiment

A signal control apparatus will be described first with reference to the drawings. As shown in FIG. 1, an electronic control unit for an electric power steering (EPS-ECU) 10 is provided as a signal control apparatus according to a first embodiment and is applied to an electric power steering apparatus 8, which assists a steering operation of a vehicle, together with a motor 80 provided as a rotary electric machine. Hereinafter, the EPS-ECU 10 will be simply referred to as an ECU 10. FIG. 1 shows an overall configuration of a steering system 90 including the electric power steering apparatus 8. The steering system 90 includes a steering wheel 91, a steering shaft 92, a pinion gear 96, a rack shaft 97, road wheels 98 and the electric power steering apparatus 8.

The steering wheel 91 is a steering member of a vehicle and connected to the steering shaft 92. A torque sensor 94 is provided on the steering shaft 92 to detect a steering torque Ts. The torque sensor 94 includes a first torque detector 194 and a second torque detector 294. The pinion gear 96 is provided at an axial end of the steering shaft 92. The pinion gear 96 meshes with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. The rotational motion of the steering shaft 92 is converted into a linear motion of the rack shaft 97 by the pinion gear 96. The pair of road wheels 98 is steered to an angle corresponding to the displacement amount of the rack shaft 97.

The electric power steering apparatus 8 includes a driving device 40, which includes the motor 80 and the ECU 10, and a reduction gear 89 or the like as a power transmission mechanism that reduces the rotation of the motor 80 and transmits the rotation to the steering shaft 92. The electric power steering apparatus 8 of the present embodiment is a column assist type. It may alternatively be a rack assist type that transmits the rotation of the motor 80 to the rack shaft 97. In the present embodiment, the steering shaft 92 is a driven object.

Figure 2:
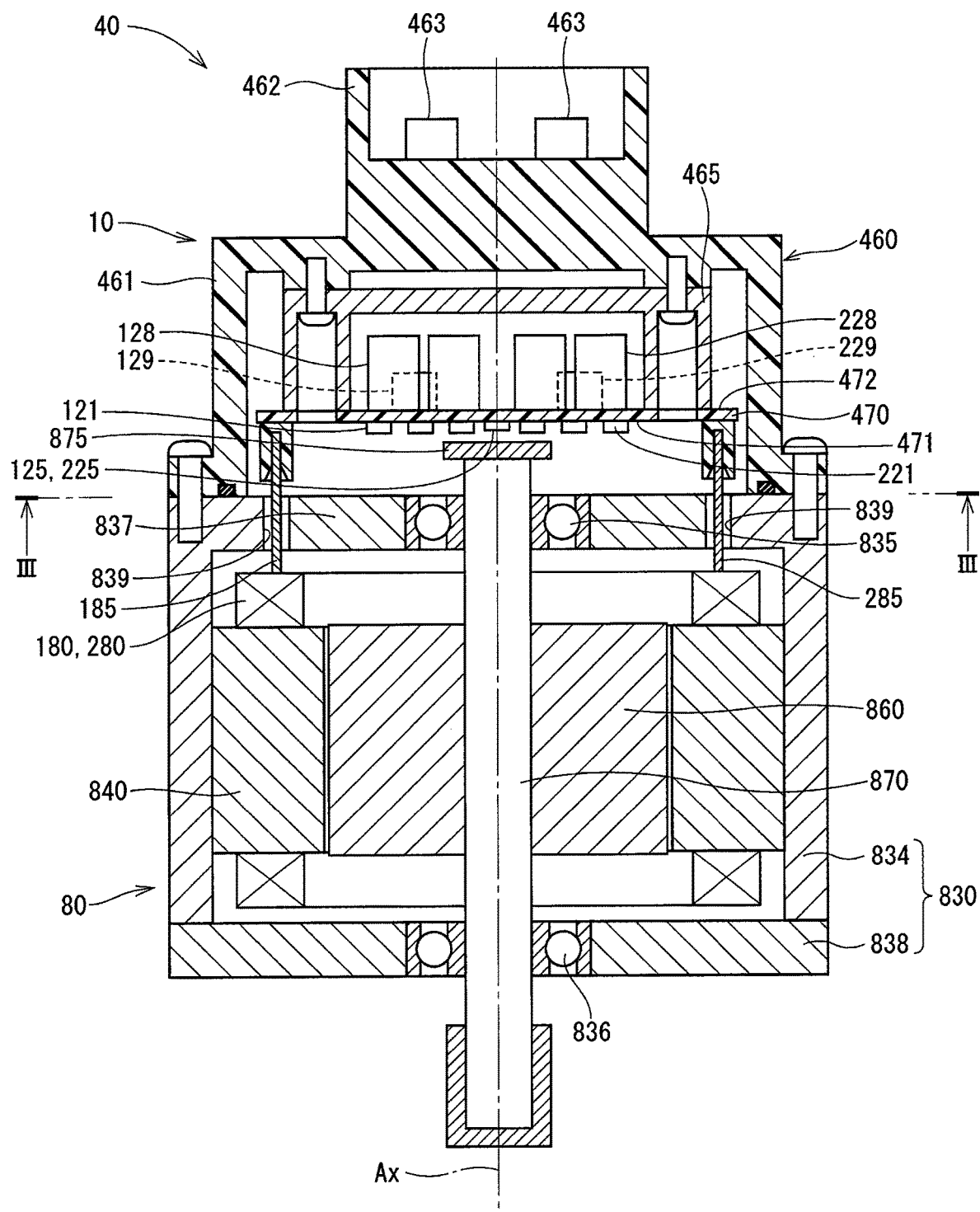
FIG. 2 is a cross-sectional view showing a driving device in the first embodiment.
Figure 3:
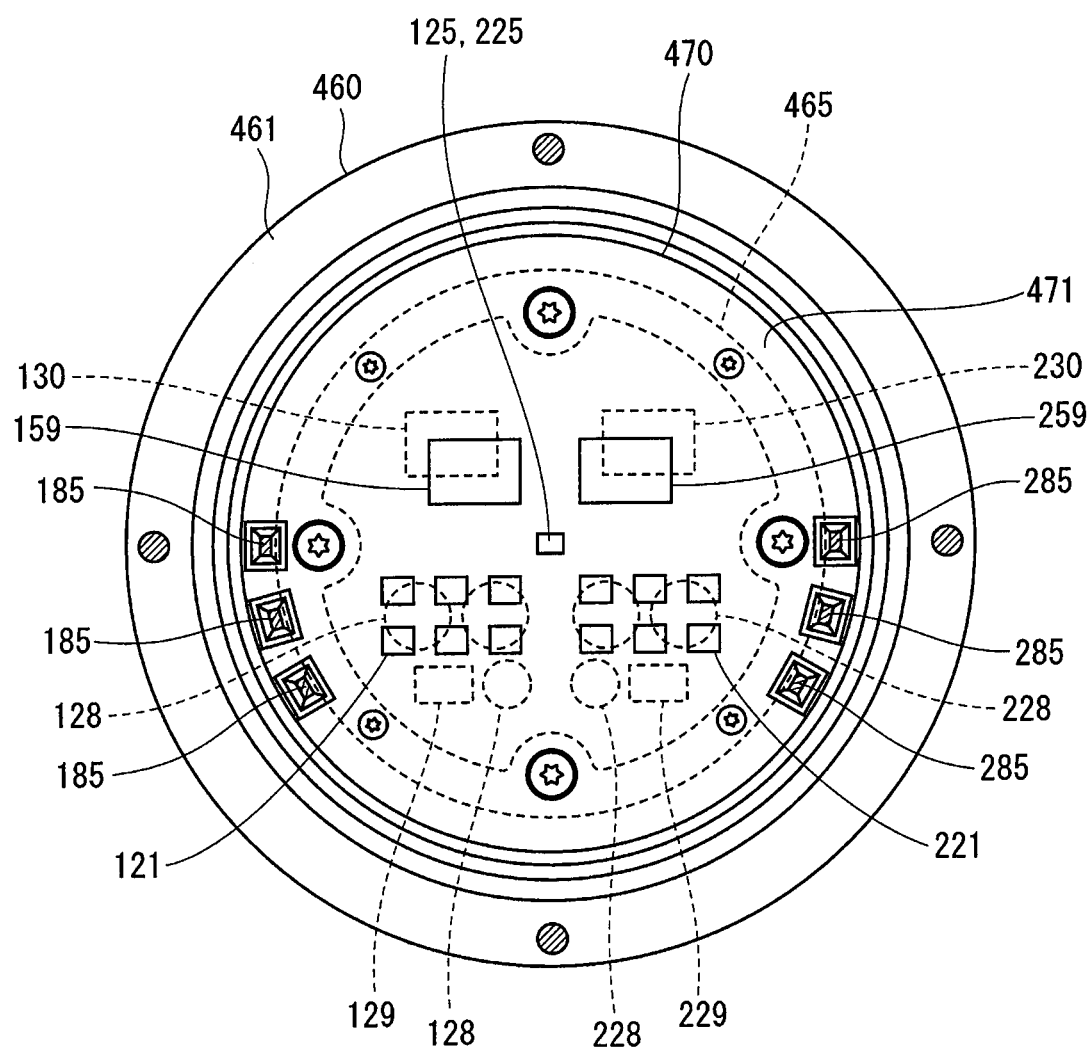
FIG. 3 is a cross-sectional view taken along a line III-III in FIG. 2.

The motor 80 outputs a whole or a part of an assist torque required for a steering operation. The motor 80 is driven by electric power supplied from a battery (not shown) provided as a power supply to rotate the reduction gear 89 in forward and reverse directions. The motor 80 is a three-phase brushless motor and has a stator 840 and a rotor 860 as shown in FIG. 2 and FIG. 3.

The motor 80 has a first motor winding set 180 and a second motor winding set 280 in correspondence to two motor driving systems (power supply systems), which will be referred to as first and second systems L1 and L2 in the following description. Further, one and the other of the motor driving systems will be referred to as an own system and the other system, respectively. The motor winding sets 180 and 280 have the same electrical characteristics. For example, the motor winding sets 180 and 280 are wound on the common stator 840 by shifting an electrical angle of 30 [deg] from each other. Correspondingly, phase currents are controlled to be supplied to the motor winding sets 180 and 280 such that the phase currents have a phase difference φ of 30 [deg]. By optimizing a current supply phase difference, the output torque is improved. It is possible to reduce sixth torque ripple. Furthermore, it is possible to maximize advantage of cancellation of noise and vibration since the current supply with the phase difference averages the current. Since heat generation is also averaged, it is possible to not only reduce errors in a detection value of each sensor and torque, which depend on temperature, between two drive systems but also average an amount of current which is allowed to be supplied.

Figure 4:
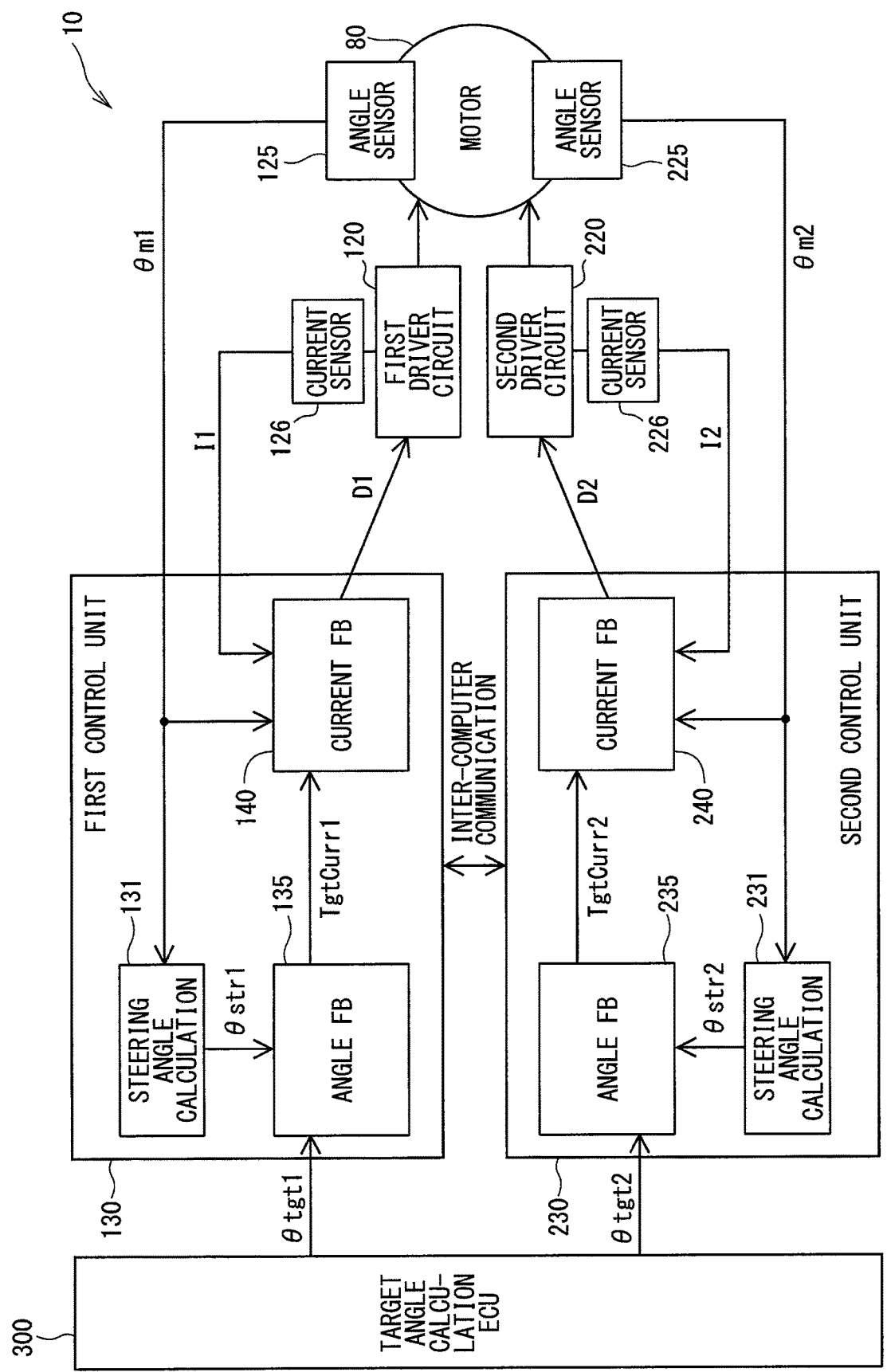
FIG. 4 is a block diagram showing an ECU in the first embodiment.

Hereinafter, a combination of a first inverter circuit 120 and a first control unit 130 and the like, which are related to the driving control for the first motor winding set 180 as shown in FIG. 4, will be referred to as the first system L1 and a second inverter circuit 220 and a second control unit 230 and the like, which are related to the driving control for the second motor winding set 280 as shown in FIG. 4, is referred to as the second system L2. The configuration related to the first system L1 is basically indicated with reference numerals having 100 and the configuration related to the second system L2 is basically indicated with reference numerals having 200. In the first system L1 and the second system L2, same or similar configurations are indicated with same reference numbers in the least significant two digits. For the other configuration described below, the term "first" is indicated with a suffix "1," and the term "second" is indicated with a suffix "2."

In the driving device 40, the ECU 10 is integrally provided on one side in the axial direction of the motor 80 in a machine-electronics integrated type. The motor 80 and the ECU 10 may alternatively be provided separately without integration. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to efficiently arrange the ECU 10 and the motor 80 in the vehicle having restricted mounting space.

The motor 80 includes the stator 840, the rotor 860 and a housing 830 which houses the stator 840 and the rotor 860 therein. The stator 840 is fixed to the housing 830 and the motor winding sets 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. The end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on the open side of the case 834. The cylindrical case 834 and the front end frame 838 are fastened to each other by bolts or the like. Lead wire insertion holes 839 are formed in the rear end frame 837. Lead wires 185 and 285 connected to each phase of the motor winding sets 180 and 280 are inserted through the lead wire insertion holes 839. The lead wires 185 and 285 are taken out from the lead wire insertion holes 839 to the ECU 10 side and connected to a circuit board 470 of the ECU 10.

The ECU 10 includes a cover 460, a heat sink 465 fixed to the cover 460, the circuit board 470 fixed to the heat sink 465 and other electronic components mounted on the circuit board 470.

The cover 460 is provided to protect the electronic components from external impacts and to prevent dust and water from entering into the ECU 10. In the cover 460, a cover main body 461 and a connector member 462 are integrally formed. The connector member 462 may alternatively be separated from the cover main body 461. Terminals 463 of the connector member 462 are connected to the circuit board 470 via a wiring (not shown) or the like. The number of connectors and the number of terminals varies in correspondence to the number of signals and the like. The connector member 462 is provided at the end portion in the axial direction of the driving device 40 and is open on the side opposite to the motor 80. The connector member 462 includes each connector described later.

The circuit board 470 is, for example, a printed circuit board and is positioned to face the rear end frame 837. On the circuit board 470, the electronic components of the first and second systems L1 and 12 are mounted independently for each system so that the two driving systems are provided in a fully redundant configuration. In the present embodiment, the electronic components are mounted on one circuit board 470 but the electronic components may alternatively be mounted on a plurality of circuit boards.

Of the two principal surfaces of the circuit board 470, one surface on the side of the motor 80 is referred to as a motor-side surface 471 and the other surface opposite from the motor 80 is referred to as a cover-side surface 472. As shown in FIG. 3, switching elements 121 configuring the driver circuit 120, switching elements 221 configuring the driver circuit 220, rotation angle sensors 126, 226, custom ICs 159, 259 and the like are mounted on the motor-side surface 471. The angle sensors 125 and 225 are mounted at positions facing the magnet 875 to be able to detect a change in the magnetic field caused by the rotation of the magnet 875.

On the cover-side surface 472, capacitors 128, 228, inductors 129, 229, and microcomputer forming the control units 130, 230 are mounted. In FIG. 3, reference numerals 130 and 230 are assigned to the microcomputers provided as the control units 130 and 230, respectively. The capacitors 128 and 228 smoothen input power supplied from the battery (not shown). The capacitors 128 and 228 assist electric power supply to the motor 80 by storing electric charge therein. The capacitors 128, 228 and the inductors 129, 229 configures filter circuits, respectively, to reduce noises transmitted from other devices which share the battery, and also to reduce noises transmitted to the other devices, which share the battery, from the driving device 40. Although not shown in FIG. 3, power supply circuits 116, 216, motor relays, current sensors 126, 226 and the like are also mounted on the motor-side surface 471 or the cover-side surface 472.

As shown in FIG. 4, the ECU 10 includes the driver circuits 120, 220, the control circuits 130, 230 and the like. In FIG. 4, in order to avoid complication, some control lines and the like are not shown. This also applies to the other embodiments. The first driver circuit 120 is a three-phase inverter having six switching elements 121, and converts the electric power supplied to the first motor winding set 180. The switching elements 121 are controlled to turn on and off based on control signals output from the first control unit 130. The second inverter circuit 220 is also a three-phase inverter having six switching elements 221, and converts the electric power supplied to the second motor winding set 280. The switching elements 221 are controlled to turn on and off based on control signals output from the second control unit 230.

The first rotation angle sensor 125 detects a rotation angle of the motor 80 and outputs a first motor rotation angle signal $\theta m1$ to the first control unit 130. The second rotation angle sensor 225 detects a rotation angle of the motor 80 and outputs a second motor rotation angle signal $\theta m2$ to the second control unit 230. The first current sensor 126 detects a current supplied to the first motor winding set 180, and outputs a first current detection signal I1 to the first control unit 130. The second current sensor 226 detects a current supplied to the second motor winding set 280, and outputs a second current detection signal to the second control unit 230.

Each of the control units 130 and 230 is mainly composed of a microcomputer or the like, and internally includes, although not shown, a CPU, a ROM, a RAM, an I/O, a bus line for connecting these components, and the like. Each processing executed by the control units 130 and 230 may be software processing or may be hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The first control unit 130 and the second control unit 230 are provided to be communicable with each other between the control units 130 and 230. Hereinafter, the communication between the control units 130 and 230 is referred to as inter-computer communication. As a communication method between the control units 130 and 230, any method such as serial communication like SPI or SENT, CAN communication, FlexRay communication or the like may be employed. This also applies to control units 138, 139 and 238 in other embodiments described later.

The first control unit 130 includes a first steering angle calculation unit 131, a first angle feedback unit 135, a first current feedback unit 140 and the like. The second control unit 230 includes a second steering angle calculation unit 131, a second angle feedback unit 235, a second current feedback unit 240 and the like. These units are functional units, which are realized by execution of stored programs by the CPU of the microcomputer. Hereinafter, the feedback is abbreviated as FB.

The first steering angle calculation unit 131 calculates a first steering angle $\theta str1$ based on the first motor rotation angle signal $\theta m1$ and outputs it to the angle FB unit 135. The second steering angle calculation unit 231 calculates a second steering angle $\theta str2$ based on the second motor rotation angle signal $\theta m2$ and outputs it to the angle FB unit 235. The steering angles $\theta str1$ and $\theta str2$ are calculated by integrating motor angle change amounts, which are converted with a gear ratio relative to a steering angle 0 point calculated using a control state such as the steering angle 0 point stored in neutral or a straight traveling state of the vehicle. However, it may be calculated by any other methods. Further, the angle sensors 125 and 225 output, for example, the motor angles and rotation speeds, thereby calculating absolute angles by the control units 130 and 230 and calculating the steering angles within the angle sensors 125 and 225. It is preferable to make corrections based on vehicle information such as vehicle speed and power supply voltage.

Figure 5:
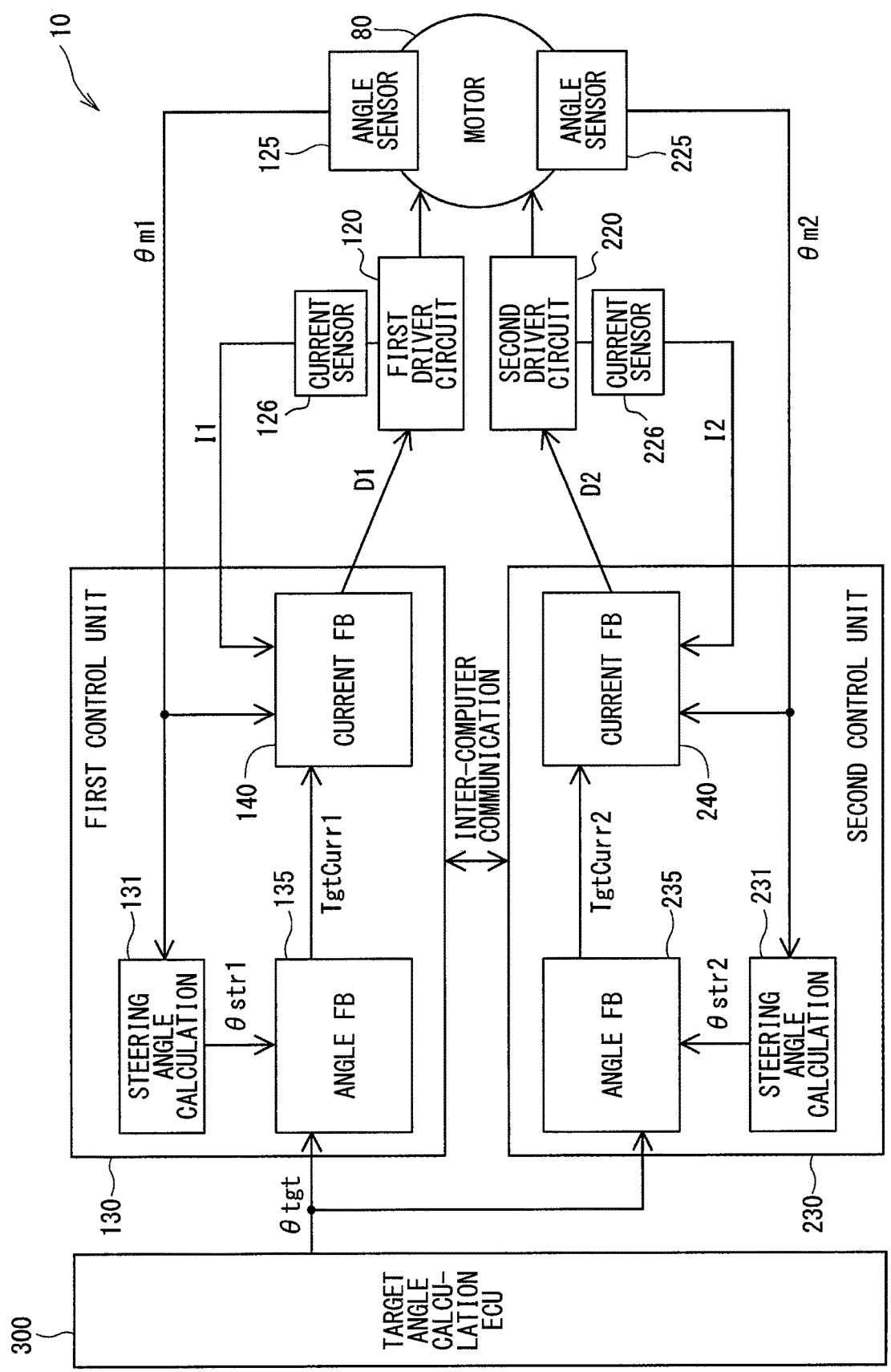
FIG. 5 is a block diagram showing the ECU in the first embodiment.

The first angle FB unit 135 acquires a target angle $\theta tgt1$ from a target angle calculation ECU 300 and calculates and outputs a first current command value TgtCurr1 corresponding to the target angle $\theta tgt1$ by the angle FB calculation. The second angle FB unit 235 acquires a target angle $\theta tgt2$ from the target angle calculation ECU 300 and calculates and outputs a second current command value TgtCurr2 corresponding to the target angle $\theta tgt2$ by the angle FB calculation. The command value to be calculated may be a torque command value instead of the current command value. As shown in FIG. 5, a common target angle $\theta tgt$ may be input to the angle FB units 135 and 235. In the present embodiment, the target angle is the target steering angle but may alternatively be a motor angle.

The first current FB unit 140 calculates a first duty command value D1 by the current FB calculation based on the command value calculated by the first angle FB unit 135, the first current detection signal I1 and the first motor rotation angle signal $\theta m1$ and outputs the calculated command value D1 to the first driver circuit 120. The second current FB unit 240 also calculates a second duty command value D2 by the current FB calculation based on the command value calculated by the second angle FB unit 235, the second current detection signal I2 and the second motor rotation angle signal $\theta m2$ and outputs the calculated command value D2 to the second driver circuit 220. By switching on and off the switching elements 121 and 221 based on the duty command values D1 and D2, the currents supplied to the motor winding sets 180 and 280 are controlled thereby to control driving of the motor 80.

The angle FB units 135 and 235 calculate the current command values TgtCurr1 and TgtCurr2 based on the following equations (1-1) and (1-2) by using angle differences $\theta diff1$ and $\theta diff2$, respectively. Without being limited to the equations (1-1) and (1-2), for example, a trapezoid approximation or the like may be used. Further, any arithmetic calculations using the angle differences $\theta diff1$ and $\theta diff2$ may be used.

$$TgtCurr1 = P \times \theta diff1 + I \times \Sigma \theta diff1 \quad (1\text{-}1)$$

$$TgtCurr2 = P \times \theta diff2 + I \times \Sigma \theta diff2 \quad (1\text{-}2)$$

Figure 6:
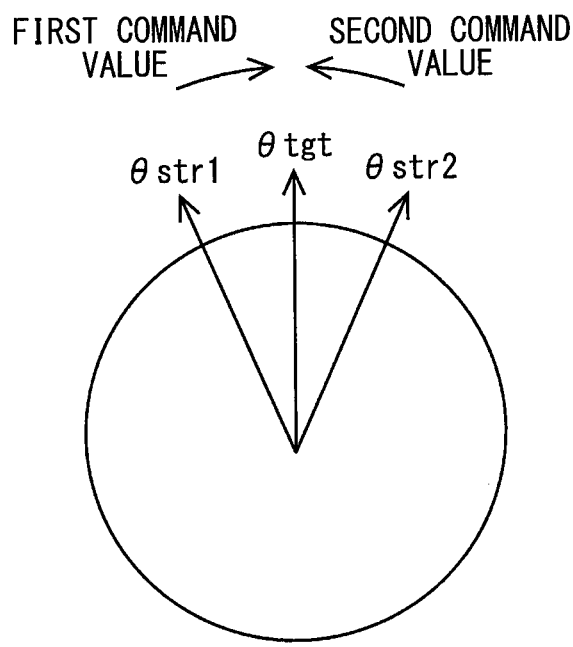
FIG. 6 is an explanatory diagram for explaining an angle error.

In case that there are errors in the steering angles θstr1 and θstr2 as shown in FIG. 6 and there is only one motor 80 to be controlled, if control is performed based on the respective current command values TgtCurr1 and TgtCurr2, it is balanced at a time point when the torques corresponding to the current command values TgtCurr1 and TgtCurr2 of the control units 130 and 230 are balanced at angles having errors relative to the target angles θtgt1 and θtgt2. At this time, the I term in the equation accumulates and the current command values TgtCurr1 and TgtCurr2 become infinitely large without limit. As a result, an excessively large torque is output causing overheating. In FIG. 6, the current command values TgtCurr1 and TgtCurr2 are schematically indicated as a command value and a second command value, respectively.

Therefore, in the present embodiment, the control units 130 and 230 exchange the steering angles θstr1 and θstr2 through inter-computer communication thereby to supplement the angle difference. In the present embodiment, the control units 130 and 230 mutually transmit and receive the steering angles θstr1 and θstr2 through the inter-computer communication.

Figure 7:
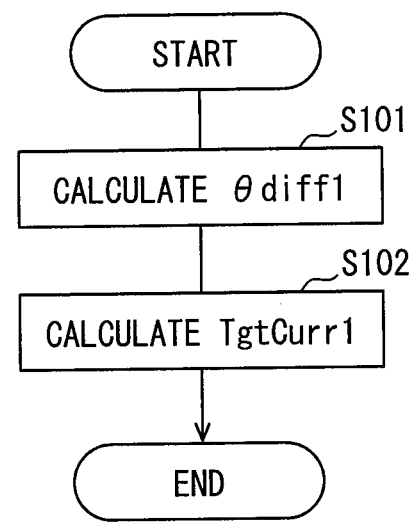
FIG. 7 is a flowchart showing command value calculation processing in the first embodiment.

Command value calculation processing in the first control unit 130 will be described with reference to a flowchart of FIG. 7. Hereinafter, "step" in each step is simply referred to as a symbol "S."

In S101, the first angle FB unit 135 calculates the first angle difference θdiff1 as defined in the following equations (2-1) and (3-1). θ1 in the equations is a first arbitration steering angle.

$$\theta1 = \theta str1 \times G11 + \theta str2 \times G12 \quad (2\text{-}1)$$

$$\theta diff1 = \theta tgt1 - \theta1 \quad (3\text{-}1)$$

In S102, the first angle FB unit 135 calculates the first current command value TgtCurr1 as defined in the equation (1-1).

Figure 8:
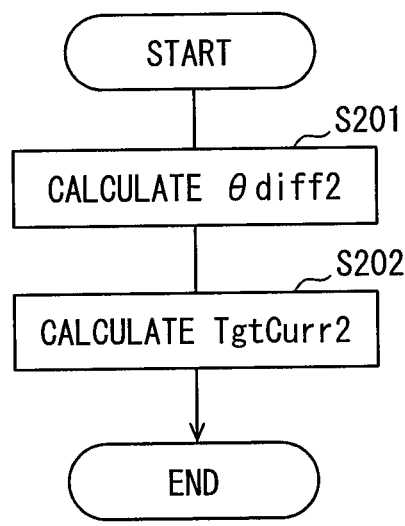
FIG. 8 is a flowchart showing the command value calculation processing in the first embodiment.

Command value calculation processing in the second control unit 230 will be described with reference to a flowchart of FIG. 8. In S201, the second angle FB unit 235 calculates the second angle difference θdiff2 as defined in the following equations (2-2) and (3-2). θ2 in the equations is a second arbitration steering angle.

$$\theta2 = \theta str1 \times G21 + \theta str2 \times G22 \quad (2\text{-}2)$$

$$\theta diff2 = \theta tgt2 - \theta2 \quad (3\text{-}2)$$

In S202, the second angle FB unit 235 calculates the second current command value TgtCurr2 as defined in the equation (1-2).

Figure 9:
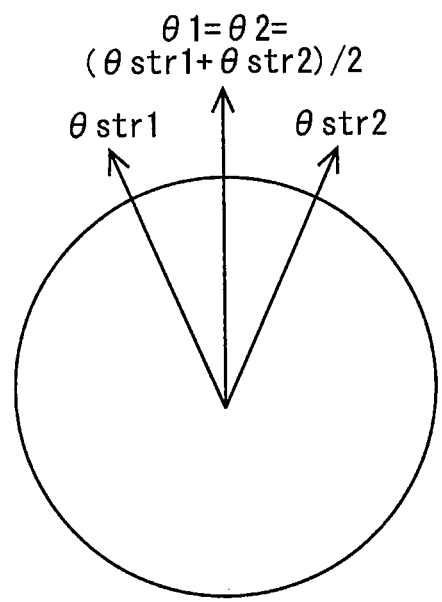
FIG. 9 is an explanatory diagram showing an arbitration steering angle in the first embodiment.

Here, G11, G12, G21 and G22 may be arbitrarily set in the range from 0 to 1 to satisfy G11+G12=1 and G21+G22=1. Assuming that all of G11, G12, G21 and G22 are 0.5, that is, G11=G12=G21=G22=0.5, the arbitration steering angles θ1 and θ2 are both average values of the steering angles θstr1 and θstr2 as shown in FIG. 9.

Figure 10:
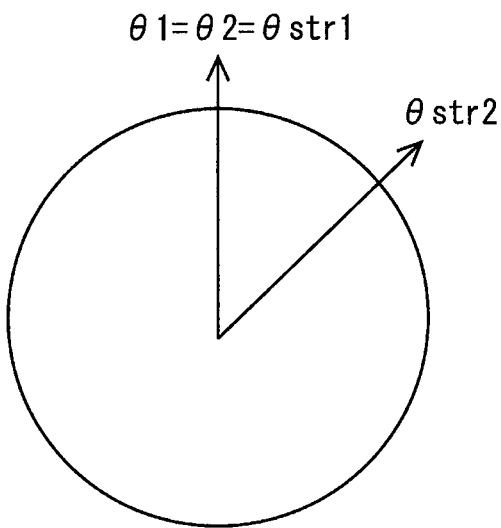
FIG. 10 is an explanatory diagram showing the arbitration steering angle in the first embodiment.

Further, assuming that G11=1, G12=0, G21=0 and G22=1, the arbitration steering angles θ1 and θ2 are adjusted to the first steering angle θstr1 as shown in FIG. 10. In this case, the first control unit 130 does not need to know the second steering angle θstr2 calculated by the second control unit 230.

In this manner, by making the arbitration steering angles θ1 and θ2 to be equal to each other, the angle differences θdiff1 and θdiff2 are made to be equal to each other. As a result, excessive output and overheating can be prevented and the driving of the motor 80 can be controlled appropriately.

Figure 11:
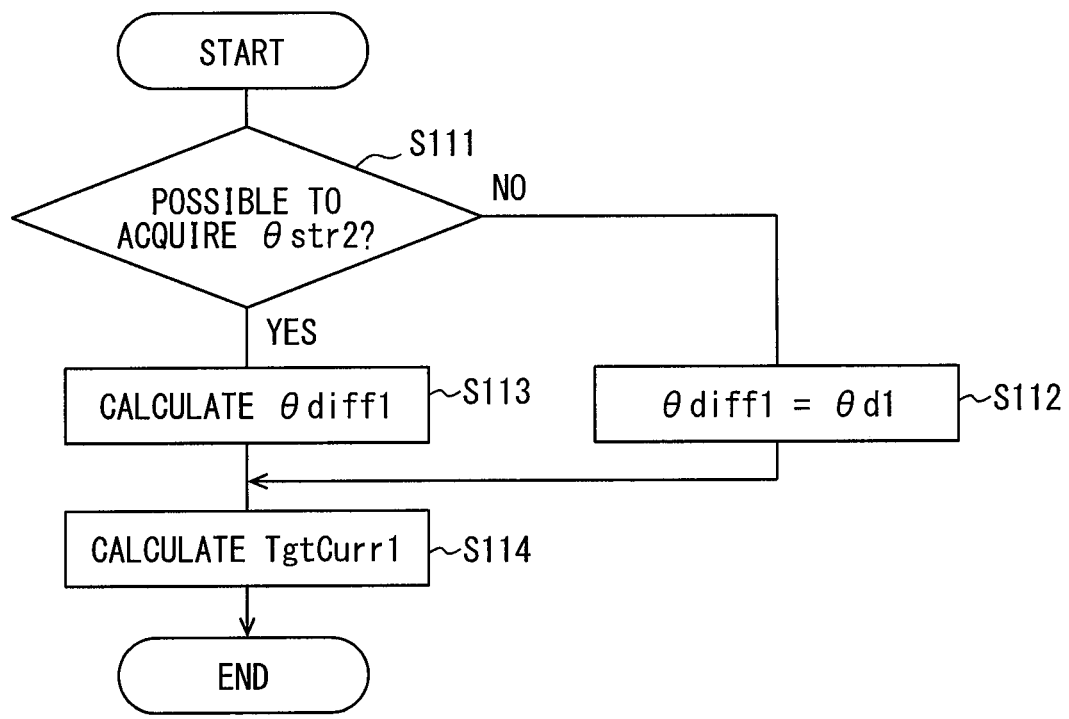
FIG. 11 is a flowchart showing switching processing to independent control in the first embodiment.

In the present embodiment, when the inter-computer communication between the microcomputers cannot be performed or when the second steering angle θstr2 is abnormal, the control may be switched to independent control or may be switched to other correction processing as exemplified in an eighth embodiment described later. Switching processing to the independent control is shown in FIG. 11. Here, processing executed by the first control unit 130 will be described as an example. In S111, the first control unit 130 checks whether it is possible to acquire the second steering angle θstr2. When it is determined that the second steering angle θstr2 cannot be acquired (S111: NO), the processing proceeds to S112, and an intra-system angle difference θd1 is set as the first angle difference θdiff1 as defined in the following equation (3-3). Processing in S113 and S114 are similar to the processing in S101 and S102 in FIG. 6.

$$\theta d1 = \theta tgt1 - \theta str1 \quad (3\text{-}3)$$

As described above, the ECU 10, which is provided as a signal control apparatus, includes a plurality of control units, for example two control units 130 and 230, that control the same motor 80. Each of the control units 130 and 230 includes the steering angle calculation units 131 and 231 and the angle FB units 135 and 235, respectively. The steering angle calculation units 131 and 231 acquire sensor signals from the angle sensors 125 and 225 provided corresponding to the steering angle calculation units 131 and 231, respectively, and calculate the steering angles θstr1 and θstr2 in correspondence to the sensor signals. The angle FB units 135 and 235 perform the angle FB control based on the angle differences θdiff1 and θdiff2, which are between the target angle θtgt1 and the steering angle θstr1 and between the target angle θtgt2 and the steering angle θstr2, respectively.

In the angular FB unit 135 or 235 of at least one of the control units 130 and 230, the angular feedback control is performed using the angle difference θdiff1 or θdiff2, which is subjected to the correction processing to reduce the error between the detection angle of the own system and the detection angle of the other system calculated by the steering angle calculation unit of the other control unit. Here, the "angle difference subjected to the correction processing" is not limited to directly correcting the angle difference but may be indirectly correcting the angle difference by correcting a value such as the target angle, the detection angle or the like which is used to calculate the angle difference. Thus, since errors in the angle differences θdiff1 and θdiff2 are reduced even in case that there are errors in the angle sensors 125 and 225, the angle FB calculation using the angle differences θdiff1 and θdiff2 can be appropriately performed. Therefore, excessive output and overheating of the motor 80 can be prevented, and the motor 80 can be appropriately controlled.

At least one of the control units 130 and 230 acquires the steering angle from the other control unit. The angle FB units 135 and 235 use the arbitration steering angles θ1 and θ2 acquired by correcting the errors of the steering angles θstr1 and θstr2 as the detection angles. As a result, it is possible to appropriately reduce the errors of the angle differences θdiff1 and θdiff2.

The electric power steering apparatus 8 includes the ECU 10 and the motor 80 which outputs the torque required for steering. The ECU 10 controls the driving of the motor 80 using the values calculated by the angle FB units 135 and 235. Thus, even when there is an error in the angle sensors 125 and 225, the steering can be appropriately assisted by the angle FB control.

In the present embodiment, the ECU 10 operates as the signal control apparatus, the angle sensors 125 and 225 operate as sensor units, and the steering angle calculation units 131 and 231 operate as angle calculation units. The steering angles θstr1 and θstr2 are the detection angles, which indicate the detection angles of the first and second systems (own system and the other system). More specifically, in the first control unit 130, the first steering angle θstr1 is the detection angle of the own system and the second steering angle θstr2 is the detection angle of the other system. On the other hand, in the second control unit 230, the second steering angle θstr2 is the detection angle of the own system and the first steering angle θstr1 is the detection signal of the other system. In addition, the arbitration steering angles θ1 and θ2 are the arbitration angles.

Second Embodiment

Figure 12:
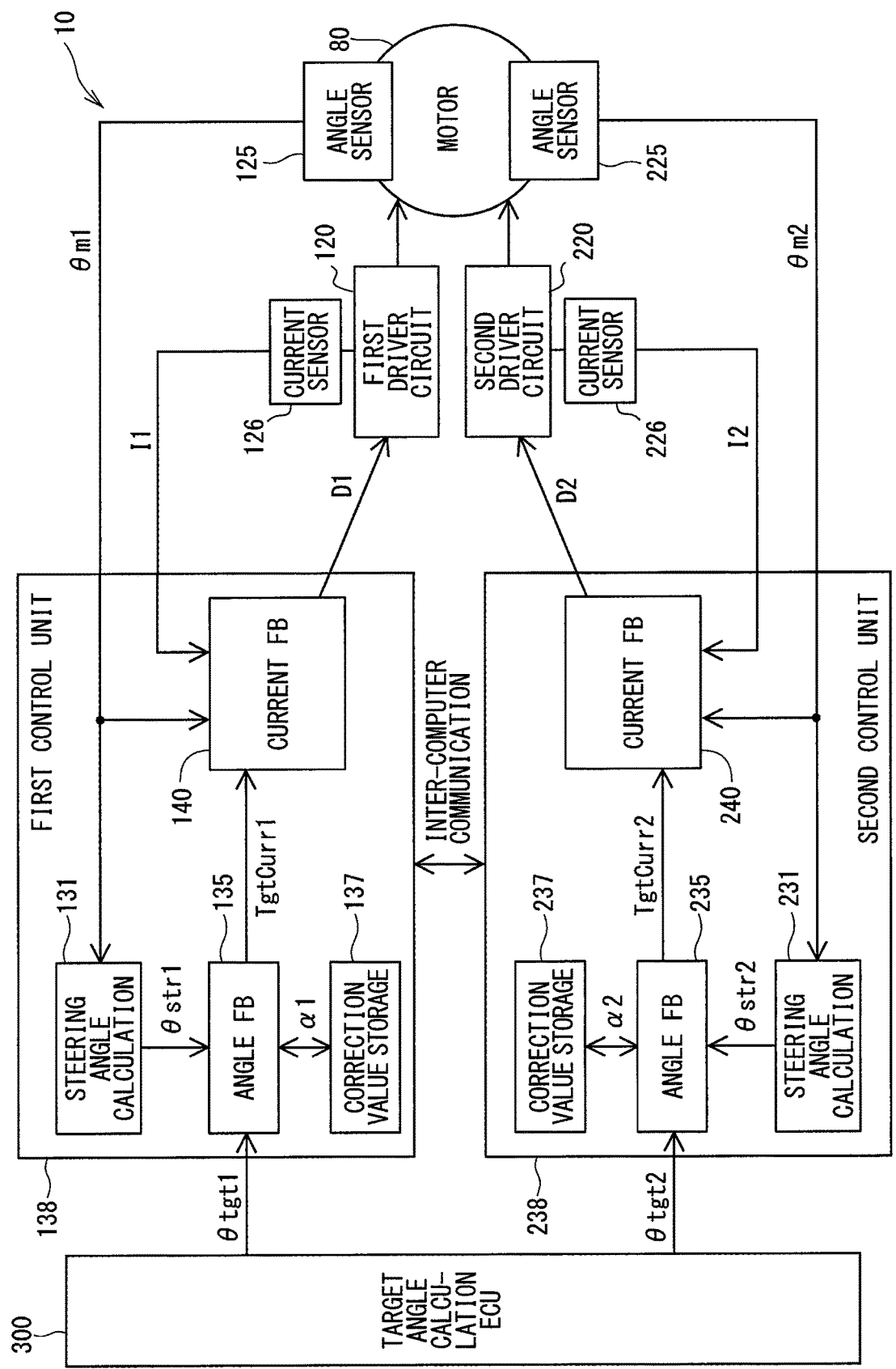
FIG. 12 is a block diagram showing an ECU in a second embodiment.
Figure 13:
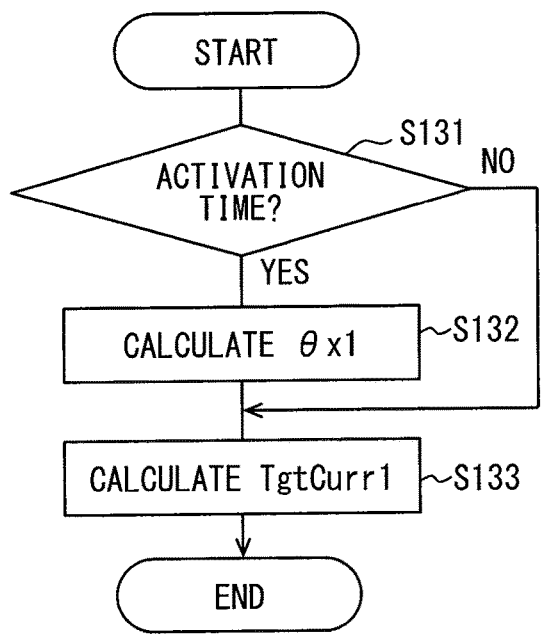
FIG. 13 is a flowchart showing command value calculation processing in the second embodiment.
Figure 14:
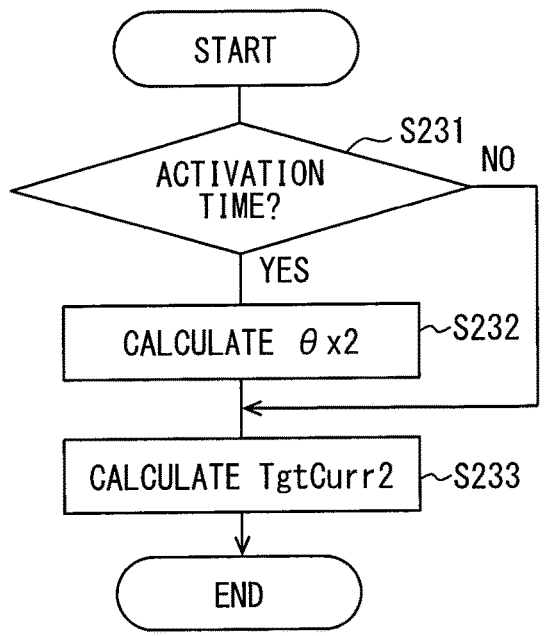
FIG. 14 is a flowchart showing the command value calculation processing in the second embodiment.

A second embodiment is shown in FIG. 12 to FIG. 14. As shown in FIG. 12, a first control unit 138 includes the first steering angle calculation unit 131, the first angle feedback unit 135, a correction value storage unit 137, the first current feedback unit 140 and the like. A second control unit 238 also includes the second steering angle calculation unit 131, the second angle feedback unit 235, a correction value storage unit 237, the second current feedback unit 240 and the like. The control units 138 and 238 mutually transmit and receive the steering angles θstr1 and θstr2. The correction value storage unit 137 stores a correction value α1 corresponding to an angle error θx1. The correction value storage unit 237 stores a correction value α2 corresponding to the angle error θx2. In the present embodiment, the correction values α1 and α2 are angle errors θx1 and θx2 but may alternatively be other values corresponding to the angle errors θx1 and θx2. In FIG. 12, the correction value storage units 137 and 237 are provided in the control units 138 and 238, respectively, but the correction value storage unit of one of the control units 138 and 238 may not be provided.

Command value calculation processing in the first control unit 138 will be described with reference to a flowchart of FIG. 13. In S131, the first control unit 138 checks whether the microcomputer has been activated, that is, in operation. When it is determined that the microcomputer has not been activated (S131: NO), processing proceeds to S133. When it is determined that the microcomputer has been activated (S131: YES), processing proceeds to S132 to calculate the angle error θx1 as defined in the following equation (4-1).

In S133, the first angle FB unit 135 calculates the first current command value TgtCurr1. This processing is almost the same as the processing of S101 and S102 in FIG. 7, but the arithmetic equation of the arbitration steering angle θ1 is different as defined in the equation (2-3).

$$\theta x1 = \theta str1 - \theta str2 \quad (4\text{-}1)$$

$$\theta1 = \theta str1 + \theta x1 \times G13 \quad (2\text{-}3)$$

Command value calculation processing in the second control unit 238 will be described with reference to a flowchart of FIG. 14. In S231, the second control unit 238 checks whether the microcomputer has been activated. When it is determined that the microcomputer has not been activated (S231: NO), processing proceeds to S233. When it is determined that the microcomputer has been activated (S231: YES), processing proceeds to S232 to calculate the angle error θx2 as defined in the following equation (4-2).

In S233, the second angle FB unit 235 calculates the second current command value TgtCurr2. This processing is almost the same as the processing of S201 and S202 in FIG. 7, but the arithmetic equation of the arbitration steering angle θ2 is different as defined in the equation (2-4).

$$\theta x2 = \theta str2 - \theta str1 \quad (4\text{-}2)$$

$$\theta2 = \theta str2 + \theta x2 \times G23 \quad (2\text{-}4)$$

Assuming that both G13 and G23 are 0.5, that is, G13=G23=0.5, the arbitration steering angles θ1 and θ2 are both the average value of the steering angles θstr1 and θstr2. Assuming that G13=0 and G23=1, the arbitration steering angles θ1 and θ2 are set to the first steering angle θstr1. Even in such a case, since the angle differences θdiff1 and θdiff2 are made to be equal to each other, excessive output can be prevented and driving of the motor 80 can be controlled appropriately. In the present embodiment, as far as the communication between the microcomputers is normal at the activation time, it is possible to continue the similar control even when the inter-computer communication becomes abnormal during the control operation.

In the present embodiment, at least one control unit 138 or 238 acquires the steering angle from the other control unit at the time of activation and calculates the angle errors θx1 and θx2 of the steering angles θstr1 and θstr2. The angle FB units 135 and 235 use the values, which are determined by correcting the steering angles θstr1 and θstr2 with the angle errors θx1 and θx2 as the detection angles, respectively. In the present embodiment, the steering angles θstr1 and θstr2 are exchanged and the angle errors θx1 and θx2 are calculated at the time of activation of the microcomputer. As a result, even when the inter-computer communication between the microcomputers becomes abnormal during the control operation, the angle FB control can be continued similarly as performed in the normal state. The present embodiment also provides the same advantages as those of the above embodiment.

In the above configuration, after acquiring the steering angle from the other control unit and calculating the angle errors θx1 and θx2 of the steering angles θstr1 and θstr2, the angle errors θx1 and θx2 may be stored as the correction values α1 and α2 in the correction value storage units 137 and 237, respectively. In this case, the correction value storage units 137 and 237 may be configured as a nonvolatile storage area such as a nonvolatile memory, for example, so that the correction values α1 and α2 are held even when the microcomputer is shut down. The angle FB units 135 and 235 use the values, which are determined by correcting the steering angles θstr1 and θstr2 of the own system with the angle errors θx1 and θx2 as the detection angles, respectively. Thus, instead of exchanging the angle information every time the microcomputer is activated, it is possible to correct the angle errors by reading out the correction values α1 and α2 at the time of activation. According to this configuration, even when the microcomputer is stopped once and re-activated after the occurrence of abnormality in the inter-computer communication after the correction, it is possible to continue the similar angle FB control as in the normal case.

Third Embodiment

Figure 15:
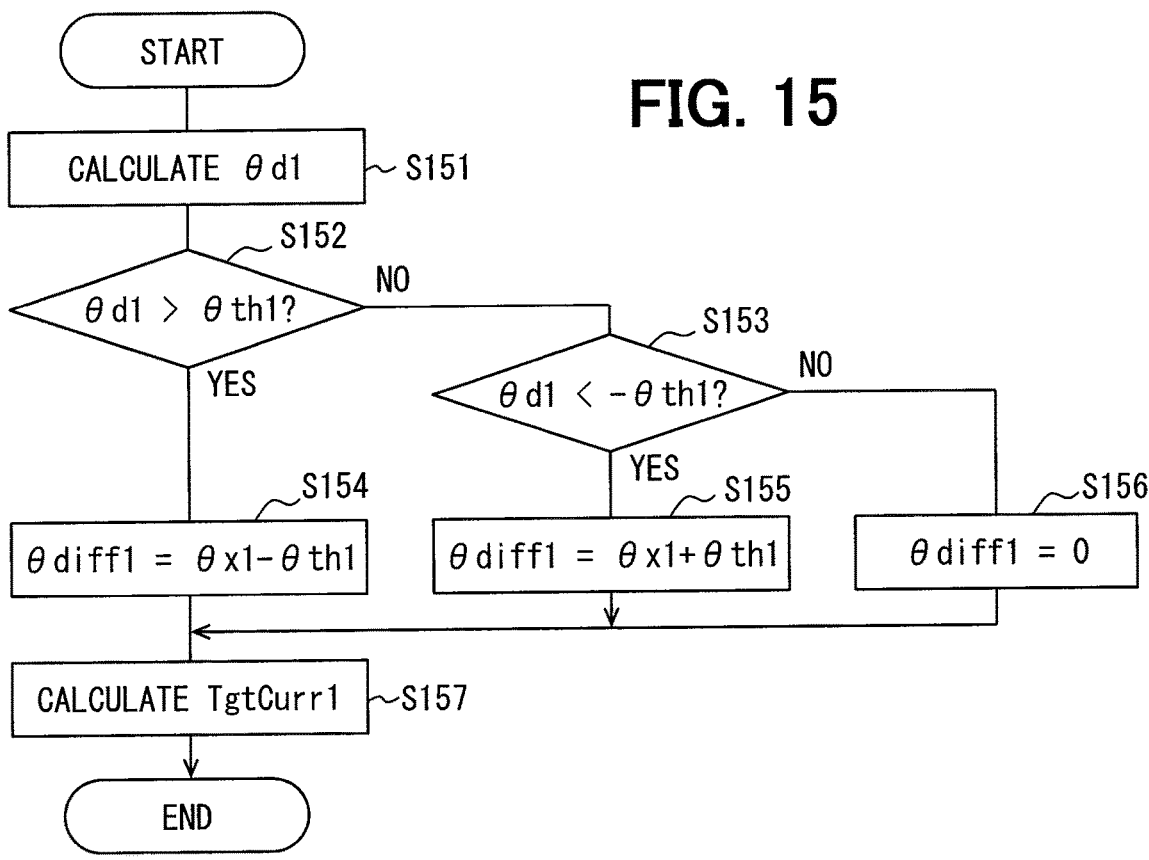
FIG. 15 is a flowchart showing command value calculation processing in a third embodiment.
Figure 16:
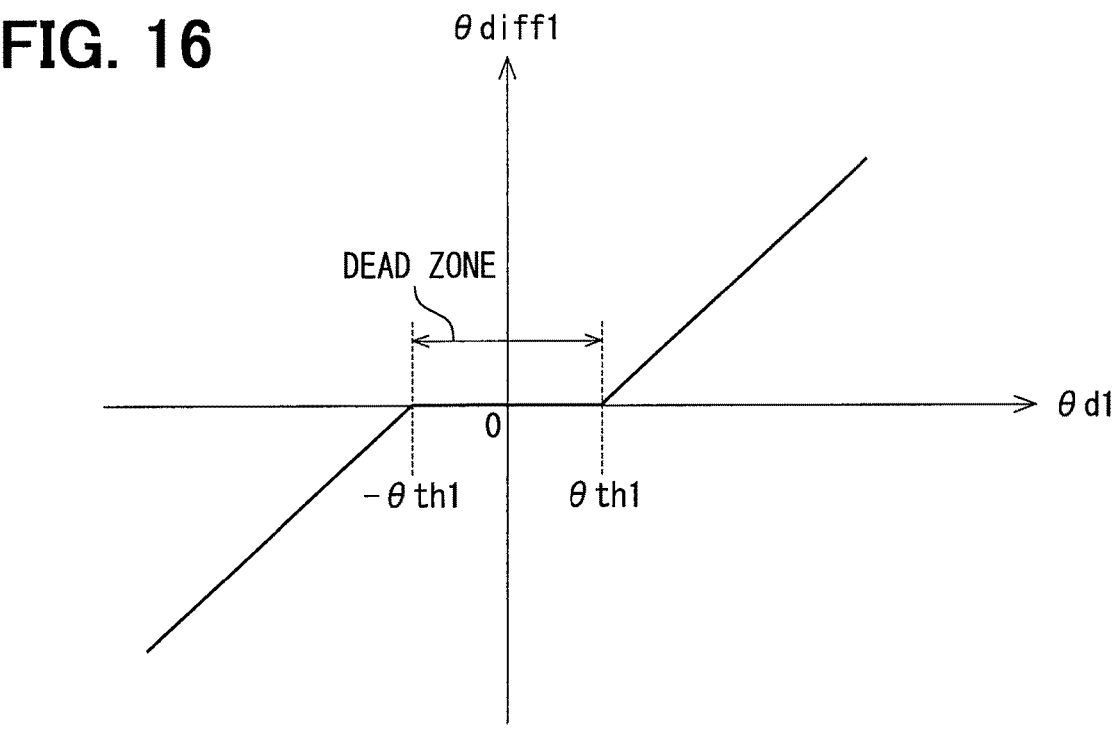
FIG. 16 is an explanatory diagram for explaining a dead zone in the third embodiment.
Figure 17:
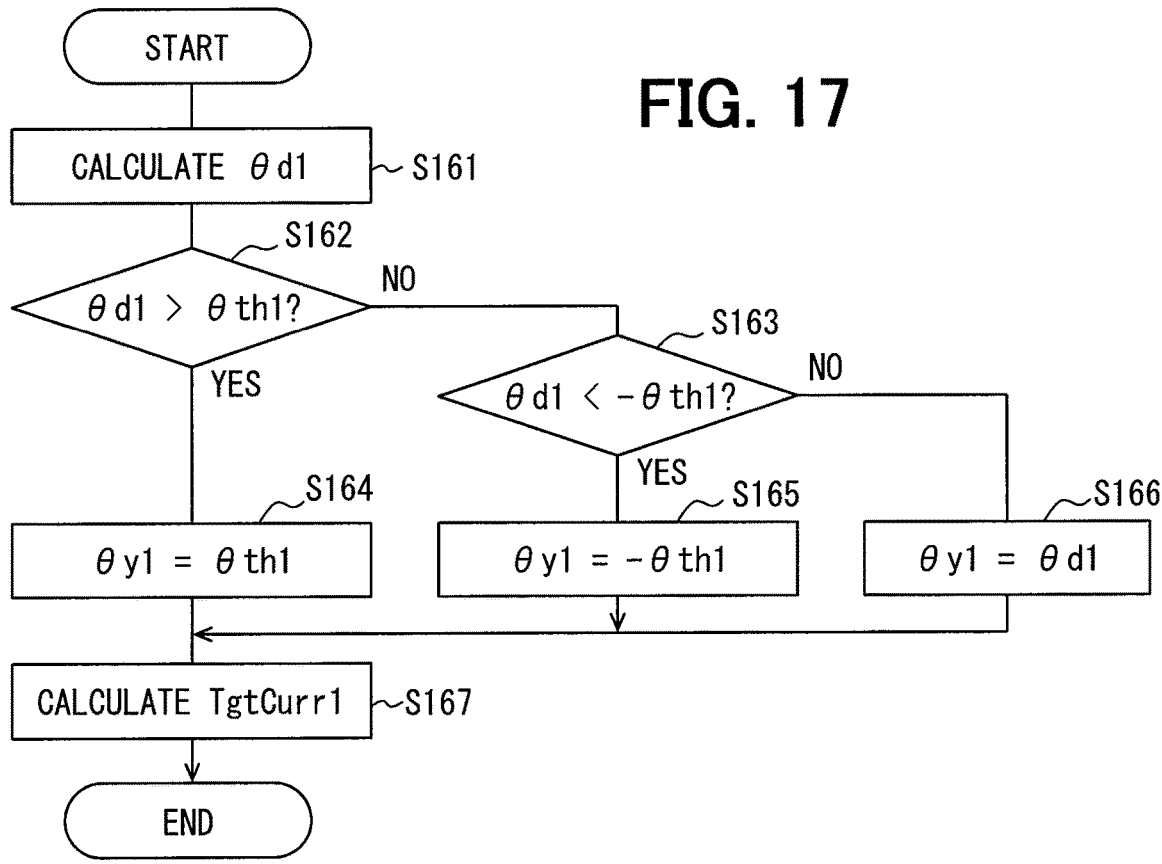
FIG. 17 is a flowchart showing the command value calculation processing in the third embodiment.

A third embodiment is shown in FIG. 15 to FIG. 17. In the above embodiments, arbitration steering angles θ1 and θ2 are calculated using the inter-computer communication. Here, when the inter-computer communication is abnormal, it is not possible to perform the angle control. It is possible to continue the control by determining a main computer side and a sub computer side, which continues the control and stops the control when the inter-computer communication is abnormal, respectively, in advance. In this case, however, it is not possible to perform the angle control when the main computer side is abnormal and the inter-computer communication is disabled.

Therefore, in the present embodiment, as shown in FIG. 15 and FIG. 16, a dead zone larger than the error between the steering angles θstr1 and θstr2 is provided. Here, processing executed by the first control unit 130 will be described as an example. Processing in the second control unit 230 may be understood by replacing the suffix "1" with "2" and "2" with "1" of the reference numerals without further explanation. Further, the control units 130 and 230 may be replaced with the control units 138 and 238 of the second embodiment. This also applies to the other embodiments. In the present embodiment, a dead zone threshold value is set to θth1 and the range between −θth1 and θth1 is set as the dead zone. The threshold value θth may be different between the positive side and the negative side. The dead zone threshold value θth1 is an arbitrary design value larger than the error depending on the errors of the steering angles θstr1 and θstr2.

Command value calculation processing in the present embodiment will be described with reference to a flowchart of FIG. 15. In S151, the angle FB unit 135 calculates an intra-system angle difference θd1 as defined in the equation (3-3).

In S152, the angle FB unit 135 checks whether the intra-system angle difference θd1 is larger than a positive-side dead zone threshold value θth1. When it is determined that the intra-system angle difference θd1 is larger than the positive-side dead zone threshold value θth1 (S152: YES), processing proceeds to S154, and the angle difference θdiff1 is calculated as defined in the following equation (5). When it is determined that the intra-system angle difference θd1 is equal to or smaller than the positive-side dead zone threshold value θth1 (S152: NO), processing proceeds to S153.

In S153, the angle FB unit 135 checks whether the intra-system angle difference θd1 is smaller than the negative-side dead zone threshold value −θth. When it is determined that the intra-system angle difference θd1 is smaller than the negative-side dead zone threshold value −θth1 (S153: YES), processing proceeds to S155, and the angle difference θdiff1 is calculated as defined in the following equation (6). When it is determined that the intra-system angle difference θd1 is equal to or larger than the negative side dead zone threshold value −θth (S153: NO), that is, when the intra-system angle difference θd1 is within the dead zone range, the angle difference is set as θdiff1=0.

$$\theta diff1 = \theta x1 - \theta th1 \qquad (5)$$

$$\theta diff1 = \theta x1 + \theta th1 \qquad (6)$$

The angle difference θdiff1 calculated in S154 to S156 varies as shown in FIG. 16. In S157 executed following S154 to S156, the angle FB unit 135 calculates the current command value TgtCurr1 as defined in the equation (1-1).

Instead of the processing shown in the flowchart of FIG. 15, the command value calculation processing may be performed as shown in a flowchart of FIG. 17. Although the calculation methods are different between the processing of FIG. 15 and FIG. 17, results are the same. The processing of S161 to S163 in FIG. 17 are similar to the processing of S151 to S153 in FIG. 15.

In S164 which is executed when the check result of S162 is YES, the angle FB unit 135 sets an angle error θy1 as a positive-side dead zone threshold value θth1. In S165 which is executed when the check result of S163 is YES, the angle FB unit 135 sets the angle error θy1 as the negative-side dead zone threshold value −θth1. In S166 which is executed when the check result of S163 is NO, the angle FB unit 135 sets the angle error θy1 as the intra-system angle difference θd1.

In S167, the angle FB unit 135 calculates the current command value TgtCurr1. This processing is almost the same as the processing of S101 and S102 in FIG. 7, but the arithmetic equation of the arbitration steering angle θ1 is different as defined in the following equation (7).

$$\theta1 = \theta str1 + \theta y1 \qquad (7)$$

In the present embodiment, both of the angle FB units 135 and 235 are exemplified as having the dead zone. It is however also possible that one of the angle FB units 135 and 235 has the dead zone and the other of the angle FB units 135 and 235 does not have the dead zone. In this case, within the dead zone, the command value determined by the microcomputer having no dead zone is outputted. For example, in case that the dead zone is not provided in the first angle FB unit 135 and the dead zone is provided in the second angle FB unit, the absolute value of the control amount toward the target angle θtgt1 is larger than the absolute value of the control amount toward the target angle θtgt2. As a result, the actual motor angle is controlled toward the target angle θtgt2 finally. Even in this case, it is possible to prevent excessive output and overheating which are caused by the errors of the angle differences θdiff1 and θdiff2. This also applies to the fourth embodiment.

In the present embodiment, the dead zones are set according to the errors of the steering angles θstr1 and θstr2. When the difference between the target angle θtgt and the steering angle θstr1 is within the range of the dead zone, the angle FB unit 135 sets the angle difference θdiff1 to 0. When the difference between the target angle θtgt and the steering angle θstr1 is outside the range of the dead zone, the angle difference θdiff1 is set to the value corrected in correspondence to the width of the dead zone. Specifically, the positive-side threshold values defining the dead zone are defined as the positive-side dead zone threshold values θth1 and θth2, and the negative-side threshold values defining also the dead zone are defined as the negative-side dead zone threshold values −θth1 and −θth2. When the difference between the target angle θtgt1 and the steering angle θstr1 is larger than the positive-side dead zone threshold value θth1, the value calculated by subtracting the steering angle θstr1 and the positive-side dead zone threshold value θth1 from the target angle θtgt1 is set as the angle difference θdiff as defined by the equation (5). When the difference between the target angle θtgt1 and the steering angle θstr1 is smaller than the negative-side dead zone threshold value −θth1, the value calculated by subtracting the steering angle θstr1 and the negative-side dead zone threshold value −θth1 from the target angle θtgt1 is set as the angle difference θdiff as defined by the equation (6).

In the present embodiment, the inter-computer communication is not used for the correction processing relating to the error reduction of the angle differences θdiff1 and θdiff2. As a result, even when, for example, the inter-computer communication between the microcomputers is abnormal, errors of the angle differences θdiff1 and θdiff2 can be reduced and the angle FB calculation can be appropriately performed. The present embodiment also provides the same advantages as those of the above embodiments.

Fourth Embodiment

Figure 18:
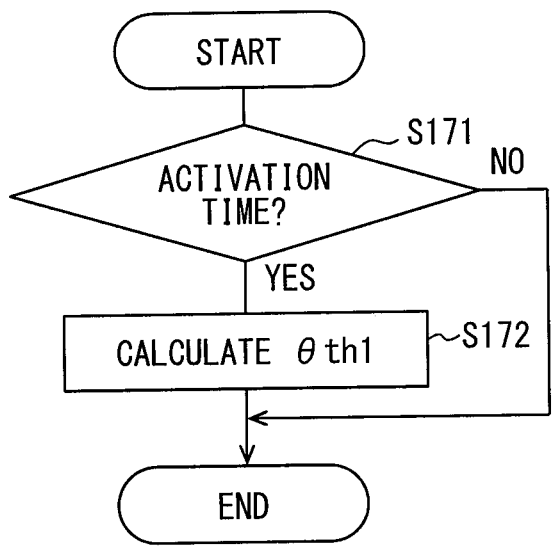
FIG. 18 is a flowchart showing learning processing in a fourth embodiment.
Figure 19:
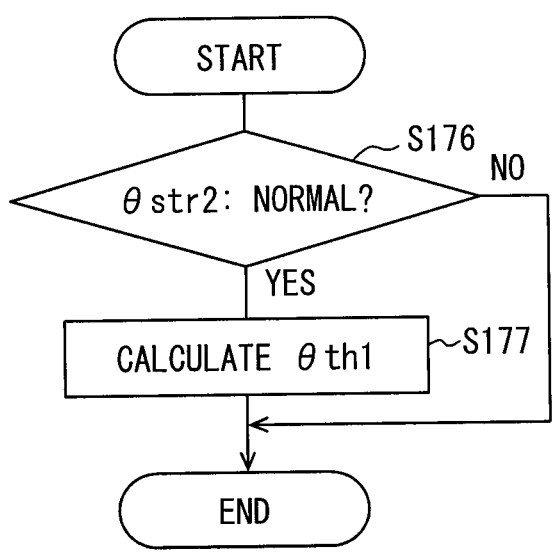
FIG. 19 is a flowchart showing the learning processing in the fourth embodiment.

A fourth embodiment is shown in FIG. 18 and FIG. 19. In the third embodiment described above, the dead zone is preset to the fixed value and the inter-computer communication is unnecessary. In the present embodiment, the dead zone is set by learning errors of the steering angles θstr1 and θstr2 through the inter-computer communication. By learning the dead zone, it is possible to minimize the width of the dead zone so that deterioration of controllability can be reduced. FIG. 18 is a flowchart for explaining learning processing in case of learning the dead zone at the activation time. The present embodiment will be described with respect to a calculation operation in the first control unit 130.

In S171, the first control unit 130 checks whether the microcomputer has been activated. When it is determined that the microcomputer has not been activated (S171: NO), the present routine is finished without executing the processing of S172. When it is determined that the microcomputer has been activated (S171: YES), processing proceeds to S172 to calculate the dead zone threshold value θth1 as defined in the following equation (8).

$$\theta th1 = \theta str1 - \theta str2 \quad (8)$$

FIG. 19 shows learning of the dead zone executed by continuously performing the inter-computer communication when the steering angle of the other system is normal. In S176, the first control unit 130 checks whether the second steering angle θstr2 is normal. When it is determined that the second steering angle θstr2 is not normal (S176: NO), the present routine is finished without executing the processing of S177. When it is determined that the microcomputer has been activated (S176: YES), processing proceeds to S177 to calculate the dead zone threshold value θth1 as defined in the following equation (8) in the similar manner as S172.

The control unit 130 acquires the second steering angle θstr2 and sets the dead zone based on the first steering angle θstr1 and the second steering angle θstr2. Thus, the dead zone can be appropriately set, and the dead zone width can be narrowed. The present embodiment also provides the same advantages as those of the above embodiments.

Fifth Embodiment

Figure 20:
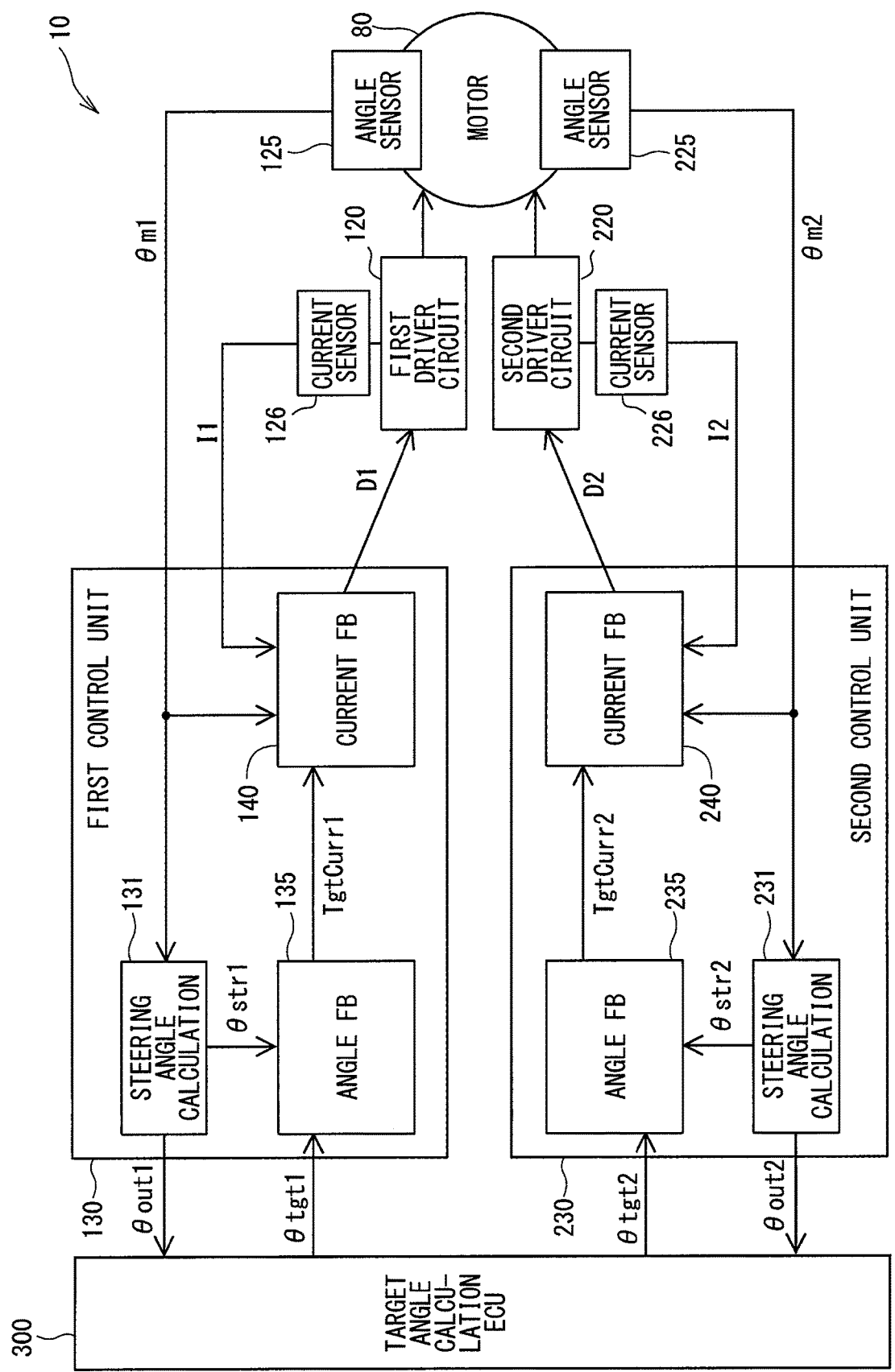
FIG. 20 is a block diagram showing an ECU according to a fifth embodiment.

A fifth embodiment is shown in FIG. 20. In the present embodiment, the first control unit 130 transmits an output steering angle θout1, and the second control unit 230 outputs an output steering angle θout2 to a target angle calculation unit ECU 300. In the present embodiment, the output steering angles θout1 and θout2 are the same values as the steering angles θstr1 and θstr2, respectively, but may be different values which can be subjected to angle conversion.

The target angle calculation ECU 300 corrects the target angles based on the output steering angles θout1 and θout2. In the following equations (9-1) and (9-2), the true target angle is set to θtgt_t, and the corrected values are set to θtgt1 and θtgt2.

$$\theta tgt1 = \theta tgt\_t - (\theta out1 - \theta out2) \times G14 \quad (9\text{-}1)$$

$$\theta tgt2 = \theta tgt\_t - (\theta out2 - \theta out1) \times G24 \quad (9\text{-}2)$$

Here, if both G14 and G24 are 0.5, that is, G14=G24=0.5, it is possible to control so that the true target angle θtgt_t becomes the average of the target angles θtgt1 and θtgt2.

Further, if G14=0 and G24=1, the first target angle θtgt1 becomes equal to the true target angle θtgt_t. The second target angle θtgt2 indicates the value which is calculated by adjusting the angle error of the steering angles θstr1 and θstr2 calculated by the control units 130 and 230.

The target angle θtgt1 is acquired from a target angle calculation ECU 300 which is provided to be capable of communication as a target angle calculation apparatus. The target angle calculation ECU 300 acquires the output steering angles θout1 and θout2 as values related to the detection angles from the control units 130 and 230, and corrects the target angles θtgt1 and θtgt2 based on the acquired values. The angle FB units 135 and 235 perform the angle FB control using the target angles θtgt1 and θtgt2 corrected by the target angle computing ECU 300. In the present embodiment, the inter-computer communication is not used for the correction processing relating to the error reduction of the angle differences θdiff1 and θdiff2. As a result, even when, for example, the inter-computer communication between the microcomputers is abnormal, errors of the angle differences θdiff1 and θdiff2 can be reduced and the angle FB calculation can be appropriately performed. The present embodiment also provides the same advantages as those of the above embodiments.

Sixth Embodiment

Figure 21:
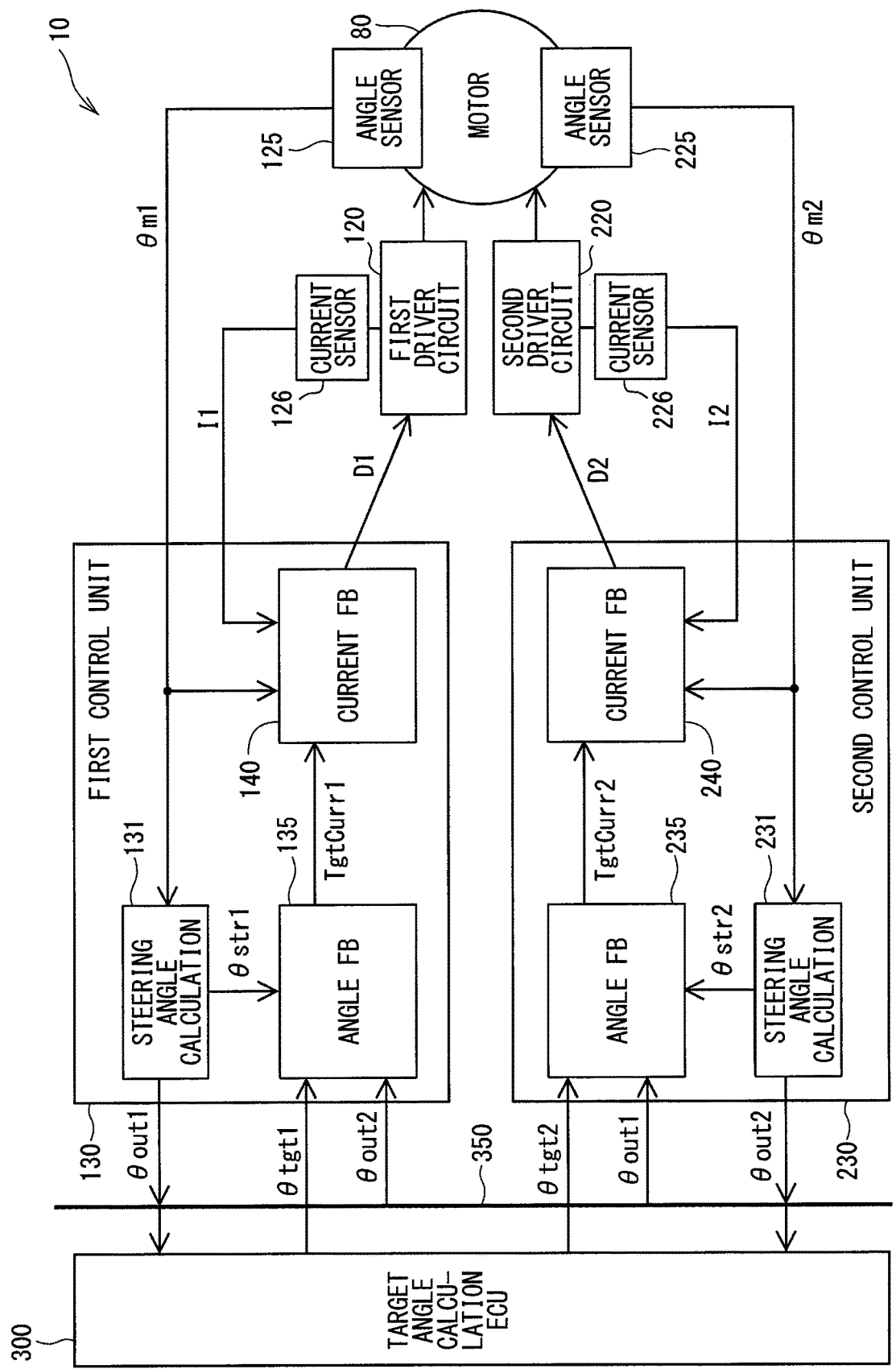
FIG. 21 is a block diagram showing an ECU according to a sixth embodiment.

A sixth embodiment is shown in FIG. 21. In the present embodiment, the first control unit 130 transmits the output steering angle θout1 to an external bus 350, and the second angle FB unit 235 acquires the output steering angle θout1 from the external bus 350. The second control unit 230 transmits the output steering angle θout2 to the external bus 350, and the first angle FB unit 135 acquires the output steering angle θout2 from the external bus 350. In the present embodiment, the control units 130 and 230 mutually acquire the output steering angles θout1 and θout2. However, it is only necessary for one of the systems to acquire the steering angle of the other of the systems and recognize and correct the angle difference. Even with such a configuration, it is possible to appropriately control the driving of the motor 80 without using the inter-computer communication. The present embodiment also provides the same advantages as those of the above embodiments.

Seventh Embodiment

Figure 22:
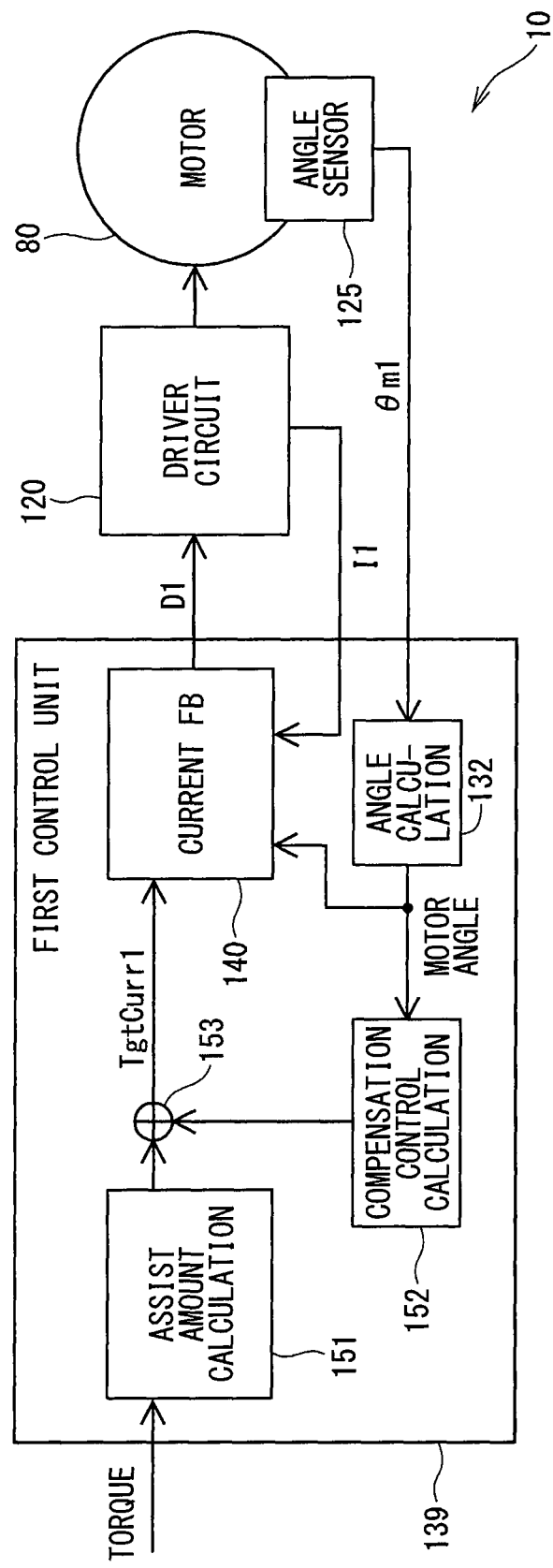
FIG. 22 is a block diagram showing an ECU according to a seventh embodiment.

A seventh embodiment is shown in FIG. 22. Since similar calculations are performed in both systems L1 and L2, only the first control unit 139 of the first system L1 is shown in FIG. 22, and the second control unit is not shown. The first control unit 139 includes the angle calculation unit 132, the current FB unit 140, an assist amount calculation unit 151, a compensation control calculation unit 152, an adder 153 and the like.

The angle calculation unit 132 calculates the motor angle based on the first motor rotation angle signal θm1. In case the angle sensor 125 calculates the motor angle, the angle calculation unit 132 may acquire the motor angle from the angle sensor 125.

The assist amount calculation unit 151 calculates a basic current command value TgtCurr1_b as the assist amount corresponding to the steering torque. The compensation control calculation unit 152 calculates a compensation amount C1 using the first motor rotation angle signal θm1. The adder 153 adds the basic current command value TgtCurr1_b and the compensation amount C1 and calculates the current command value TgtCurr1. The current FB unit 140 calculates the duty command value D1 by the current FB calculation based on the current command value Tgt-Curr1 similarly to the above embodiment.

The compensation control calculation unit 152 performs compensation control using the motor angle. The compensation control includes, for example, return control for outputting a control amount in a direction to return the steering wheel 91 according to the angle difference θdiff1, with the steering angle 0 point as the target angle. The processing for reducing the influence of the errors of the angle differences θdiff1 and θdiff2 described in the above embodiments may be applied to various calculations such as the compensation control of the present embodiment using the angle differences θdiff1 and θdiff2. The angle differences θdiff1 and θdiff2 may be values calculated based on the motor angle. That is, in the present embodiment, the compensation control calculation unit 152 operates as the angle feedback unit. This configuration also provides the similar effect as the embodiments described above.

Eighth Embodiment

An eighth embodiment is shown in FIG. 23. In the present embodiment, description will be made mainly on switching of control between normal state and abnormal state. Control patterns 1 to 6 in FIG. 23 correspond to the first to sixth embodiments, respectively. In brief summary, the control pattern 1 continuously exchanges the steering angles θstr1, θstr2 by the inter-computer communication. The control pattern 2 exchanges the steering angle θstr1 and θstr2 at the activation time by the inter-computer communication. The control pattern 3 is provided with the predefined dead zone. In the fourth embodiment, it is exemplified that the dead zone is calculated at the activation time and continuously. However, the control pattern 4 calculates the dead zone only at the activation time. The control pattern 5 changes the target angles θtgt1 and θtgt2 by the target angle calculation ECU 300. The control pattern 6 exchanges the steering angles θstr1 and θstr2 via the external bus 350. The control pattern A transmits the control amount calculated by one control unit to the other control unit by inter-computer communication and the other control unit performs the control based on the acquired control amount. FIG. 23 shows abnormal states and executability of control. In FIG. 23, a circle ○ indicates that the control can be executed and a cross X indicates that the control cannot be executed.

When the inter-computer communication between the microcomputers is disabled from the time of activation of the control units 130 and 230, it is not possible to perform the control patterns 1, 2, 4 and A which use the inter computer communication, and it is possible to perform the control patterns 3, 5 and 6.

When the inter-computer communication is normal at the activation time but becomes abnormal during the control operation, it is not possible to perform the control patterns 1 and A which use the inter-computer communication always, and it is possible to perform the other control patterns.

When the external bus 350 fails, it is not possible to perform the control patterns 5 and 6 which use the external bus communication, and it is possible to perform the other control patterns. If the external bus 350 fails, it is impossible to acquire the target angles θtgt1 and θtgt2 from the target angle calculation ECU 300. For this reason, it cannot be applied to control in which the target angle θtgt changes in real time, but it can be applied to the compensation control such as the return control (refer to seventh embodiment) in which the target angle is available in advance.

For example, assuming that one of the control units is a main control unit and the other of the control units is a sub control unit, the control amount calculated by the main control unit is transmitted to the sub control unit by the inter-computer communication as the control pattern A when the inter-computer communication is normal, and the control pattern is switched to the control pattern 2 or the control pattern 3 when the inter-computer becomes abnormal. The control pattern at the time of normal inter-computer communication may be any pattern, and the control pattern to be shifted at the time of abnormal inter-computer communication may be any control pattern that can be performed without using the inter-computer communication. This also applies to the external bus communication. Thereby, even when abnormality occurs in the inter-computer communication or the external bus communication, the drive control of the motor 80 can be appropriately continued.

In the present embodiment, the correction processing for reducing the error between the other-system detection angle and the self-system detection angle is different between when the communication between the control units 130 and 230 is normal and when it is abnormal. Thus, the angle FB calculation can be appropriately performed in correspondence to the communication state between the control units 130 and 230.

Each of the control units 130 and 230 includes one main control unit and at least one sub control unit. Here, the first control unit 130 is assumed to be the main control unit and the second control unit 230 is assumed to be the sub control unit. When the communication between the control units 130 and 230 is normal, all the control units 130 and 230 share by communication the control amount which is based on the value calculated by the angle FB unit 135 of the first control unit 130. When the communication between the control units 130 and 230 is abnormal, at least one of the angle FB units 135 and 235 performs the angle FB calculation by using the angle differences θdiff1 and θdiff2 subjected to the correction processing. Thus, when the communication between the control units 130 and 230 is normal, the driving of the motor 80 can be appropriately controlled based on the control amount calculated by the main control unit. The control amount shared by the control units 130 and 230 is, for example, the current command value, the torque command value, the voltage command value or the like. Further, it is possible to appropriately perform the angle FB calculation even when the communication abnormality occurs between the control units 130 and 230.

Other Embodiment

In the above embodiments, two pairs of winding sets are provided and wound with the phase shifted by 30 [deg] for cancellation of noise and vibration. As the embodiment, the phase difference between the winding sets and the winding sets method on the stator may be different from that of the above embodiments. The electric power steering apparatus of the above embodiments is formed of two systems each of which has the winding sets set, driving circuit and control units. As the other embodiment, the number of systems may be three or more. Further, a plurality of winding sets and driver circuits may be provided for each winding sets set. In the above embodiments, the rotary electric machine is a three-phase brushless motor. As the other embodiment, the number of phases of the rotating electrical machine may be other than three phases. Further, the rotary electric machine is not limited to the brushless motor but may be any other motors.

In the above embodiments, the sensor unit is the rotation angle sensor that detects the rotation angle of the motor. As the other embodiment, the sensor unit may be a steering angle sensor that detects the rotation angle of the steering wheel or a torque sensor, which is other than the motor rotation angle sensor.

In the above embodiments, the signal control apparatus is applied to the electric power steering apparatus. As the other embodiment, the signal control apparatus may be applied to other apparatuses different from the electric power steering apparatus. The present disclosure is not limited to the embodiments described above, and various modifications may be implemented without departing from the spirit of the present disclosure.

What is claimed is:

1. A signal control apparatus comprising:
at least two control units configured to control a rotary electric machine, wherein
the at least two control units include a first control unit and a second control unit,
the first control unit is configured to:
  acquire a first sensor signal from a first sensor, the first sensor configured to detect a rotation angle of the rotary electric machine; and
  calculate a detection angle of a first system in correspondence to the first sensor signal; and
  perform angle feedback control based on a first angle difference between a target angle of the first system and the detection angle of the first system, the second control unit is configured to:
acquire a second sensor signal from a second sensor that is different from the first sensor, the second sensor configured to detect the rotation angle of the rotary electric machine;
calculate a detection angle of a second system in correspondence to the second sensor signal; and
perform angle feedback control based on a second angle difference between a target angle of the second system and the detection angle of the second system, wherein:
the first control unit performs the angle feedback control based on the first angle difference between the target angle of the first system and the detection angle of the first system, in which the detection angle of the first system is corrected using a correction value, the correction value corresponding to an angle error, which is a difference between the detection angle of the first system and the detection angle of the second system calculated by the second control unit; and
the first control unit includes a memory configured to store the correction value.

2. The signal control apparatus according to claim 1, wherein the first control unit is further configured to:
acquire the detection angle of the second system; and
use, as the detection angle of the first system, an arbitration angle which is subjected to correction of error between the detection angle of the first system and the detection angle of the second system.

3. The signal control apparatus according to claim 1, wherein the first control unit is further configured to:
acquire the detection angle of the second system from the second control unit at activation time; and
calculate the angle error between the detection angle of the first system and the detection angle of the second system; and
use, as the detection angle of the first system, an angle which is calculated by correcting the detection angle of the first system with the angle error.

4. The signal control apparatus according to claim 1, wherein the first control unit is further configured to:
set the first angle difference to 0 when the difference between the target angle and the detection angle of the first system is within a dead zone, which is set in correspondence to an error between the detection angle of the first system and the detection angle of the second system; and
set the first angle difference to the angle which is corrected in correspondence to the dead zone when the difference between the target angle and the detection angle of the first system is outside the dead zone.

5. The signal control apparatus according to claim 4, wherein the first control unit is further configured to:
acquire the detection angle of the second system and set the dead zone in correspondence to the detection angle of the first system and the detection angle of the second system.

6. The signal control apparatus according to claim 1, wherein the first control unit is further configured to:
acquire the target angle of the first system from a target angle calculation apparatus provided externally to be capable of communication;
transmit a value related to the detection angle to the target angle calculation apparatus which corrects the target angle of the first system based on the transmitted value; and
perform the angle feedback by using the target angle of the first system, which is corrected by the target angle calculation apparatus.

7. The signal control apparatus according to claim 1, wherein:
the first and second control units are configured to perform the correction processing differently between a normal state and an abnormal state of communication.

8. The signal control apparatus according to claim 1, wherein:
the first and second control units are configured to share a control value, which corresponds to a value calculated by the first control unit and communicated thereto in a normal state of communication between the first and second control units; and
the first control unit is configured to perform the angle feedback control by using the first angle difference subjected to the correction processing in an abnormal state of communication between the first and second control units.

9. An electric power steering apparatus comprising:
the signal control apparatus according to claim 1; and
the rotary electric machine outputting torque used for steering of a vehicle,
wherein the signal control apparatus controls driving of the rotary electric machine by using values calculated by the first and second control units.

10. A signal control apparatus comprising:
at least two microcomputers configured to control a rotary electric machine, wherein
the at least two microcomputers include a first microcomputer and a second microcomputer,
the first microcomputer is programmed to:

acquire a first sensor signal from a first sensor, the first sensor configured to detect a rotation angle of the rotary electric machine;

calculate a detection angle of a first system in correspondence to the first sensor signal; and perform angle feedback control based on a first angle difference between a target angle of the first system and the detection angle of the first system, the second microcomputer is programmed to:

acquire a second sensor signal from a second sensor that is different from the first sensor, the second sensor configured to detect the rotation angle of the rotary electric machine;

calculate a detection angle of a second system in correspondence to the second sensor signal; and perform angle feedback control based on a second angle difference between a target angle of the first system and the detection angle of the second system, and wherein the first microcomputer is programmed to perform the angle feedback control by using the first angle difference, which is subjected to correction processing for reducing an angle error between the detection angle of the first system and the detection angle of the second system, and wherein:

the first microcomputer performs the angle feedback control based on the first angle difference between the target angle of the first system and the detection angle of the first system, in which the detection angle of the first system is corrected using a correction value, the correction value corresponding to an angle error, which is a difference between the detection angle of the first system and the detection angle of the second system calculated by the second microcomputer; and the first microcomputer includes a memory configured to store the correction value.

11. The signal control apparatus according to claim 10, wherein:

the first microcomputer is programmed to acquire the detection angle of the second system from the second microcomputer; and the first microcomputer is programmed to use as the detection angle of the first system, an arbitration angle which is subjected to correction of error between the detection angle of the first system and the detection angle of the second system.

12. The signal control apparatus according to claim 10, wherein:

the first microcomputer is programmed to acquire the detection angle of the second system from the second microcomputer at activation time and calculate the angle error between the detection angle of the first system and the detection angle of the second system; and the first microcomputer is programmed to use, as the detection angle of the first system, an angle which is calculated by correcting the detection angle of the first system with the angle error.

13. The signal control apparatus according to claim 10, wherein:

the first microcomputer is programmed to set the first angle difference to 0 when the difference between the target angle and the detection angle of the first system is within a dead zone, which is set in correspondence to an error between the detection angle of the first system and the detection angle of the second system; and the first microcomputer is programmed to set the first angle difference to the angle which is corrected in correspondence to the dead zone when the difference between the target angle and the detection angle of the first system is outside the dead zone.

14. The signal control apparatus according to claim 13, wherein:

the first microcomputer is programmed to acquire the detection angle of the second system and set the dead zone in correspondence to the detection angle of the first system and the detection angle of the second system.

15. The signal control apparatus according to claim 10, wherein:

the first microcomputer is programmed to acquire the target angle of the first system from a target angle calculation apparatus provided externally to be capable of communication;

the first microcomputer is programmed to transmit a value related to the detection angle of the first system to the target angle calculation apparatus which corrects the target angle of the first system based on the transmitted value; and the first microcomputer is programmed to perform the angle feedback by using the target angle of the first system, which is corrected by the target angle calculation apparatus.

16. The signal control apparatus according to claim 10, wherein:

the first microcomputer is programmed to perform the correction processing differently between a normal state and an abnormal state of communication.

17. The signal control apparatus according to claim 10, wherein:

the first microcomputer and the second microcomputer are programmed to share a control value, which corresponds to a value calculated by the first microcomputer communicated thereto in a normal state of communication with the second microcomputer; and the first microcomputer is programmed to perform the angle feedback control by using the first angle difference subjected to the correction processing in an abnormal state of communication with the second microcomputer.

18. An electric power steering apparatus comprising:
the signal control apparatus according to claim 10; and
the rotary electric machine outputting torque used for steering of a vehicle,
wherein the signal control apparatus controls driving of the rotary electric machine by using values calculated by the first microcomputer and the second microcomputer.

* * * * *